(12) United States Patent
Hong et al.

(10) Patent No.: US 10,476,565 B2
(45) Date of Patent: Nov. 12, 2019

(54) APPARATUS AND METHOD FOR UPLINK TRANSMISSION IN WIRELESS COMMUNICATION SYSTEM

(71) Applicants: Samsung Electronics Co., Ltd., Suwon-si, Gyeonggi-do (KR); Seoul National University R&DB Foundation, Seoul (KR)

(72) Inventors: Sungnam Hong, Suwon-si (KR); Hee Jin Seo, Seoul (KR); Byonghyo Shim, Seoul (KR); Sunho Park, Seoul (KR); Hyoungju Ji, Seoul (KR); Taeyoung Kim, Seoul (KR); Jiyun Seol, Seongnam-si (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 15/934,492

(22) Filed: Mar. 23, 2018

(65) Prior Publication Data

US 2018/0278303 A1    Sep. 27, 2018

(30) Foreign Application Priority Data

Mar. 24, 2017    (KR) ..................... 10-2017-0037507

(51) Int. Cl.
*H04L 5/00*    (2006.01)
*H04B 7/0456*    (2017.01)
*H04J 99/00*    (2009.01)

(52) U.S. Cl.
CPC ......... *H04B 7/0456* (2013.01); *H04L 5/0016* (2013.01); *H04L 5/0037* (2013.01);
(Continued)

(58) Field of Classification Search
None
See application file for complete search history.

(56) References Cited

U.S. PATENT DOCUMENTS

| 2009/0262694 A1* | 10/2009 | Lee | H04B 7/0621 370/329 |
| 2010/0177842 A1* | 7/2010 | Chang | H04L 5/0007 375/295 |

(Continued)

FOREIGN PATENT DOCUMENTS

| CA | 2942582 A1 * | 8/2015 | ........... H04B 7/0456 |
| KR | 10-2015-0097603 A | 8/2015 | |

(Continued)

OTHER PUBLICATIONS

Bayesteh, Alireza, et al., "Blind Detection of SCMA for Uplink Grant-Free Multiple-Access," IEEE, 2014, 978-1-4799-5863-4/14, pp. 853-857.

(Continued)

*Primary Examiner* — Kodzovi Acolatse

(57) ABSTRACT

The present disclosure relates to a 5G generation or pre-5G communication system for supporting a higher data transmission rate than a 4G communication system such as LTE. The present disclosure relates to uplink transmission in a wireless communication system, and an operating method of a terminal includes: determining a second codebook for a reference signal, based on a first codebook for data; and transmitting at least one reference signal generated by using the second codebook, and at least one data signal generated by using the first codebook.

27 Claims, 22 Drawing Sheets

(52) U.S. Cl.
CPC .......... *H04L 5/0044* (2013.01); *H04J 15/00* (2013.01); *H04L 5/0048* (2013.01)

(56) References Cited

U.S. PATENT DOCUMENTS

| | | | | |
|---|---|---|---|---|
| 2014/0169408 | A1 | 6/2014 | Bayesteh et al. | |
| 2015/0171942 | A1* | 6/2015 | Yi | H04B 7/0413 370/329 |
| 2016/0337149 | A1* | 11/2016 | Wu | H04B 7/0456 |
| 2017/0047975 | A1* | 2/2017 | Lee | H04B 7/0486 |
| 2017/0126376 | A1* | 5/2017 | Wang | H04L 5/0044 |
| 2017/0288817 | A1* | 10/2017 | Cao | H04L 1/1812 |
| 2018/0014320 | A1* | 1/2018 | Xu | H04W 72/04 |
| 2018/0192435 | A1* | 7/2018 | Benjebbour | H04W 52/18 |
| 2018/0192439 | A1* | 7/2018 | Tang | H04W 74/006 |
| 2018/0343093 | A1* | 11/2018 | Li | H04B 7/0682 |

FOREIGN PATENT DOCUMENTS

| | | |
|---|---|---|
| KR | 10-2016-0106664 A | 9/2016 |
| WO | 2015149668 A1 | 10/2015 |

OTHER PUBLICATIONS

Hoshyar, Reza, et al., "Novel Low-Density Signature for Synchronous CDMA Systems Over AWGN Channel," IEEE Transactions on Signal Processing, vol. 56, No. 4, Apr. 2008, pp. 1616-1626.

Nikopour, Hosein, et al., "Sparse Code Multiple Access," 2013 IEEE 24th International Symposium on Personal, Indoor and Mobile Radio Communications: Fundamentals and PHY Track, IEEE, 2013, 978-1-4577-1348-4/13, pp. 332-336.

Wang, Bichai, et al., "Compressive Sensing Based Multi-User Detection for Uplink Grant-Free Non-Orthogonal Multiple Access," IEEE, 2015, 978-1-4799-8091-8/15, 5 pages.

* cited by examiner

APPARATUS AND METHOD FOR UPLINK TRANSMISSION IN WIRELESS COMMUNICATION SYSTEM

CROSS-REFERENCE TO RELATED APPLICATION

This application is based on and claims priority under 35 U.S.C. § 119 to Korean Patent Application No. 10-2017-0037507 filed on Mar. 24, 2017, in the Korean Intellectual Property Office, the disclosure of which is incorporated herein by reference in its entirety.

TECHNICAL FIELD

The present disclosure relates to a wireless communication system, and more particularly, to an apparatus and a method for uplink transmission in a wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The above information is presented as background information only to assist with an understanding of the present disclosure. No determination has been made, and no assertion is made, as to whether any of the above might be applicable as prior art with regard to the present disclosure.

SUMMARY

Based on the above-described discussion, the present disclosure provides an apparatus and a method for effectively transmitting uplink data in a wireless communication system.

In addition, the present disclosure provides an apparatus and a method for transmitting uplink data on a grant-free basis in a wireless communication system.

In addition, the present disclosure provides an apparatus and a method for transmitting uplink data in a non-orthogonal multiple access (NOMA) method in a wireless communication system.

In addition, the present disclosure provides an apparatus and a method for transmitting a reference signal by using a codebook determined based on a codebook for a data signal in a wireless communication system.

In addition, the present disclosure provides an apparatus and a method for effectively detecting active terminals by iterating detection of an active terminal and channel estimation in a wireless communication system.

According to various embodiments of the present disclosure, an operating method of a terminal in a wireless communication system includes: determining a second codebook for a reference signal, based on a first codebook for data; and transmitting at least one reference signal generated by using the second codebook, and at least one data signal generated by using the first codebook.

According to various embodiments of the present disclosure, an operating method of a base station in a wireless communication system includes: determining a second codebook for a reference signal based on a first codebook for data; and receiving reference signals generated by using the second codebook, and data signals generated by using the first codebook.

According to various embodiments of the present disclosure, a terminal in a wireless communication system includes: at least one processor configured to determine a second codebook for a reference signal, based on a first codebook for data; and a transmission and reception unit configured to transmit at least one reference signal generated by using the second codebook, and at least one data signal generated by using the first codebook.

According to various embodiments of the present disclosure, a base station in a wireless communication system includes: at least one processor configured to determine a second codebook for a reference signal based on a first codebook for data; and a transmission and reception unit configured to receive reference signals generated by using the second codebook, and data signals generated by using the first codebook.

The apparatus and method according to various embodiments of the present disclosure can perform effective grant-free uplink transmission by using the first codebook for the data signal and the second codebook for the reference signal, which is derived from the first codebook.

The effects that can be achieved by the present disclosure are not limited to those mentioned in the above, and other effects that are not mentioned herein could be clearly understood by a person skilled in the art based on the following descriptions.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

FIGS. 1 through 16G, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in the present disclosure are used to describe specified embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the present disclosure. In some cases, even if terms are terms which are defined in the specification, they should not be interpreted as excluding embodiments of the present disclosure.

In various embodiments of the present disclosure described below, hardware-wise approach methods will be described by way of an example. However, various embodiments of the present disclosure include technology using both hardware and software, and thus do not exclude software-based approach methods.

The present disclosure relates to an apparatus and a method for uplink transmission in a wireless communication system. Specifically, the present disclosure describes technology for transmitting uplink data in a grant-free method, for more efficient uplink transmission in a wireless communication system.

As used herein, terms indicating signals, terms indicating channels, terms indicating control information, means used to process signals (for example, a codebook, a sequence, etc.), terms indicating network entities, terms indicating states of devices (for example, active, potential, etc.), terms indicating elements of the apparatus are examples for convenience of explanation. Accordingly, the present disclosure is not limited to the terms described below, and other terms having the same technical meanings may be used.

In addition, the present disclosure will describe various embodiments by using terms used in some communication standards (for example, a long term evolution (LTE) system and LTE-Advanced (LTE-A)), but this is merely an example for convenience of explanation. Various embodiments of the present disclosure may be easily modified and applied to other communication systems.

Figure 1:
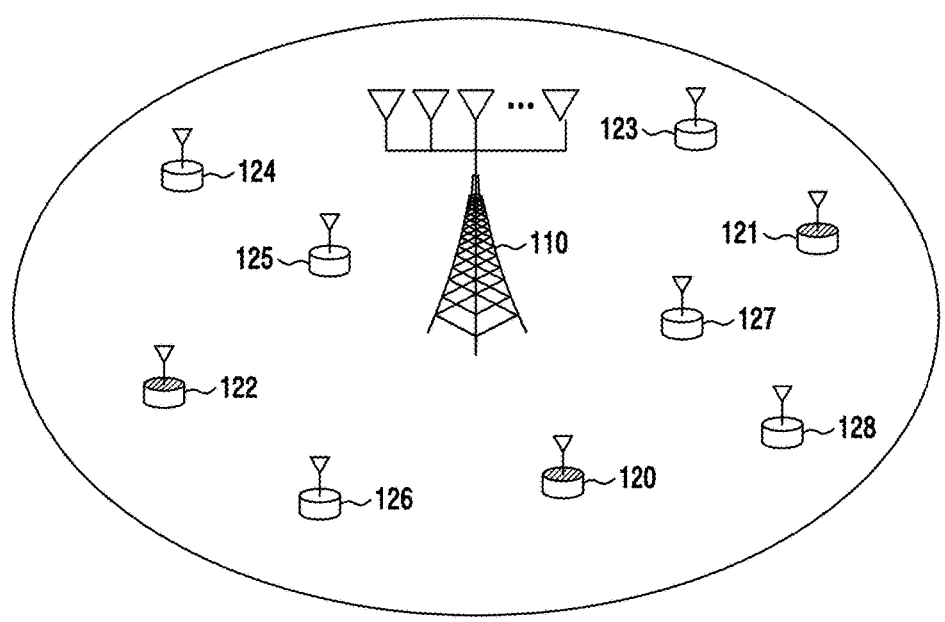
FIG. 1 is a view showing a wireless communication system according to various embodiments of the present disclosure.

FIG. 1 is a view showing a wireless communication system according to various embodiments of the present disclosure. In FIG. 1, a base station 110 and a plurality of terminals 120 to 128 are illustrated as a portion of nodes using radio channels in the wireless communication system. Although FIG. 1 illustrates only one base station, another base station which is the same or similar as or to the base station 110 may further be included. In addition, although FIG. 1 illustrates nine terminals, fewer or more terminals may exist.

The base station 110 may be a network infrastructure that provides a wireless access to the terminals 120-128. The base station 110 may have a coverage that is defined as a predetermined geographical region based on a distance within which a signal is transmitted and received. The base station 110 may be referred to as an "access point (AP)," an "eNodeB (eNB)," a 5$^{th}$ generation node (5G node)", a "wireless point," a "transmission/reception point (TRP)", or other terms having the same technical meaning as those of the above-mentioned terms, in addition to the base station.

The terminals 120-128 are devices that are used by users and may communicate with the base station 110 via radio channels. According to a circumstance, at least one of the terminals 120-128 may be managed without involvement of a user. That is, the terminals 120-128 may be devices that perform machine type communication (MTC), and may not be carried by users. A portion (120-122) of the terminals 120-128 may be active terminals, and the other portion (123-128) may be potentially active terminals. Herein, the active terminals refer to terminals that transmit uplink signals within a given time section from among the terminals accessing the base station 110, and the potentially active terminals refer to the other terminals. The active terminal and the potentially active terminal are a concept that changes with time. Each of the terminals 120-128 may be referred to as a "user equipment (UE)," a "mobile station," a "subscriber station," a "remote terminal," a "wireless terminal," a "user device," or other terms having the same technical meaning as those of the above-mentioned terms, in addition to the terminal.

According to an embodiment, the base station 110 and the terminals 120-128 may transmit and receive radio signals in a millimeter-wave (mmWave) band (for example, 28 GHz, 30 GHz, 38 GHz, 60 GHz). In this embodiment, in order to enhance a channel gain, the base station 110 and the terminals 120-128 may perform beamforming. Herein, the beamforming may include transmission beamforming and reception beamforming. That is, the base station 110 and the terminals 120-128 may give a directivity to a transmission signal or a reception signal. To achieve this, the base station 110 and the terminals 120-128 may select serving beams through a beam search procedure. However, various embodiments described below are not limited to operations in the millimeter wave band, and according to another embodiment, the base station 110 and the terminals 120-128 may perform communication in bands other than the millimeter wave band.

In addition, the base station 110 may provide various types of services to the terminals 120-128. For example, an enhanced mobile broadcast (eMBB) service supporting a high data transmission speed, an ultra-reliable low-latency (URLL) service supporting high reliability and low latency, a massive machine-type communication (mMTC) service supporting massive IoT communication, etc. may be provided. A portion of the various services may be provided through the same time-frequency resource, and the services may have different numerologies. In this embodiment, the base station 110 may support grant-free-based uplink transmission or non-orthogonal multiple access (NOMA)-based uplink transmission with respect to at least one of the above-described services.

Figure 2:
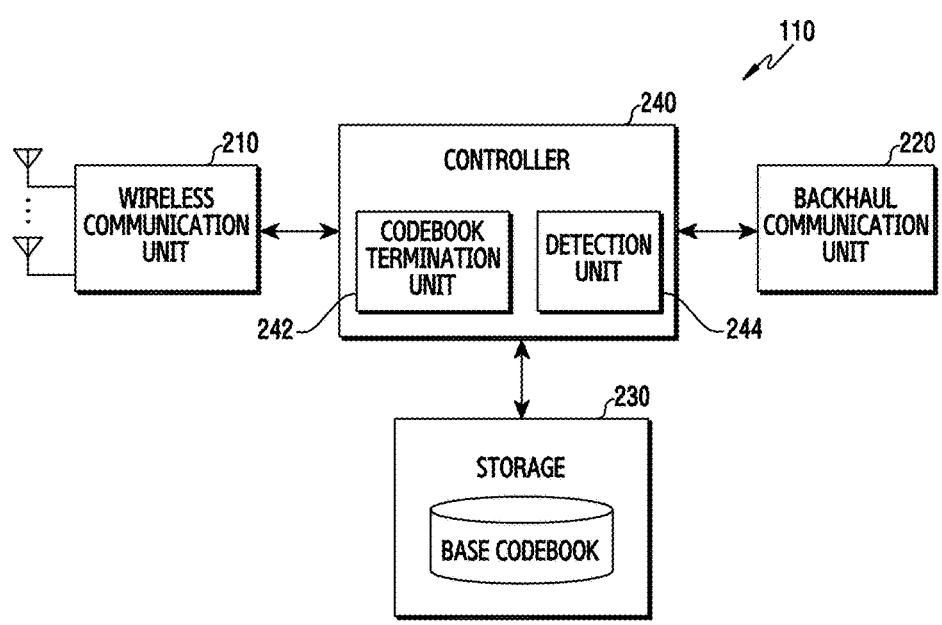
FIG. 2 is a view showing a configuration of a base station in a wireless communication system according to various embodiments of the present disclosure.

FIG. 2 is a view showing a configuration of a base station in a wireless communication system according to various embodiments of the present disclosure. The configuration illustrated in FIG. 2 may be understood as a configuration of the base station 110. The term "unit" or terms ending with suffixes "-er," and "-or" refer to a unit processing at least one function or operation and may be implemented by hardware, software, or a combination of hardware and software.

Referring to FIG. 2, the base station 110 may include a wireless communication unit 210, a backhaul communication unit 220, a storage 230, and a controller 240.

The wireless communication unit 210 performs functions for transmitting and receiving signals via a radio channel. For example, the wireless communication unit 210 may perform a function of converting between a baseband signal and a bit string according to a physical layer standard of the system. For example, when transmitting data, the wireless communication unit 210 may generate complex symbols by encoding and modulating a transmission bit string. In addition, when receiving data, the wireless communication unit 210 may restore a reception bit string by demodulating and decoding a baseband signal. In addition, the wireless communication unit 210 may up-convert a baseband signal into a radio frequency (RF) band signal, and then may transmit the signal via an antenna, and may down-convert an RF band signal received via an antenna into a baseband signal.

To achieve this, the wireless communication unit 210 may include a transmission filter, a reception filter, an amplifier, a mixer, an oscillator, a digital-to-analog converter (DAC), an analog-to-digital converter (ADC), etc. In addition, the wireless communication unit 210 may include a plurality of transmission and reception paths. Furthermore, the wireless communication unit 210 may include at least one antenna array including a plurality of antenna elements. In the hardware aspect, the wireless communication unit 210 may include a digital unit and an analog unit, and the analog unit may include a plurality of sub-units according to operating power, an operating frequency, etc.

The wireless communication unit 210 may transmit and receive signals as described above. Accordingly, an entirety or a portion of the wireless communication unit 210 may be referred to as a "transmitter," "receiver," or "transceiver." In addition, in the following description, transmitting and receiving via a radio channel may include processing by the wireless communication unit 210 as described above.

The backhaul communication unit 220 provides an interface for communicating with the other nodes in the network.

That is, the backhaul communication unit 220 may convert a bit string to be transmitted to another node, for example, another access node, another base station, an upper node, a core network, etc., into a physical signal, and may convert a physical signal transmitted from another node into a bit string.

The storage 230 may store data such as a basic program for the operation of the base station 110, an application program, setting information, etc. The storage 230 may include a volatile memory, a nonvolatile memory, or a combination of a volatile memory and a nonvolatile memory. According to various embodiments, the storage 230 may store a base codebook. The base codebook may be at least one codebook related to a data signal, and may be used to generate another codebook related to a reference signal. In addition, the storage 230 provides stored data according to a request of the controller 240.

The controller 240 controls overall operations of the base station 110. For example, the controller 240 may transmit and receive signals via the wireless communication unit 210 or the backhaul communication unit 220. In addition, the controller 240 may record or read out data on or from the storage 230. In addition, the controller 240 may perform functions of a protocol stack required by the communication standard. To achieve this, the controller 240 may include at least one processor. According to various embodiments, the controller 240 may control to support an uplink transmission technique having at least one attribute of a grant-free and non-orthogonal multiple access. For example, the controller 240 may include a codebook determination unit 242 to determine at least one codebook to be used to detect an active terminal and data, and a detection unit 244 to detect an active terminal and data by using at least one codebook. Herein, the codebook determination unit 242 and the detection unit 244 may be a storage space storing, as a set of instructions or a code stored in the storage 230, an instruction/code at least temporarily resided in the controller 240, an instruction/code, or may be a portion of a circuitry constituting the controller 240. For example, the controller 240 may control the base station 110 to perform operations according to various embodiments described below.

Figure 3:
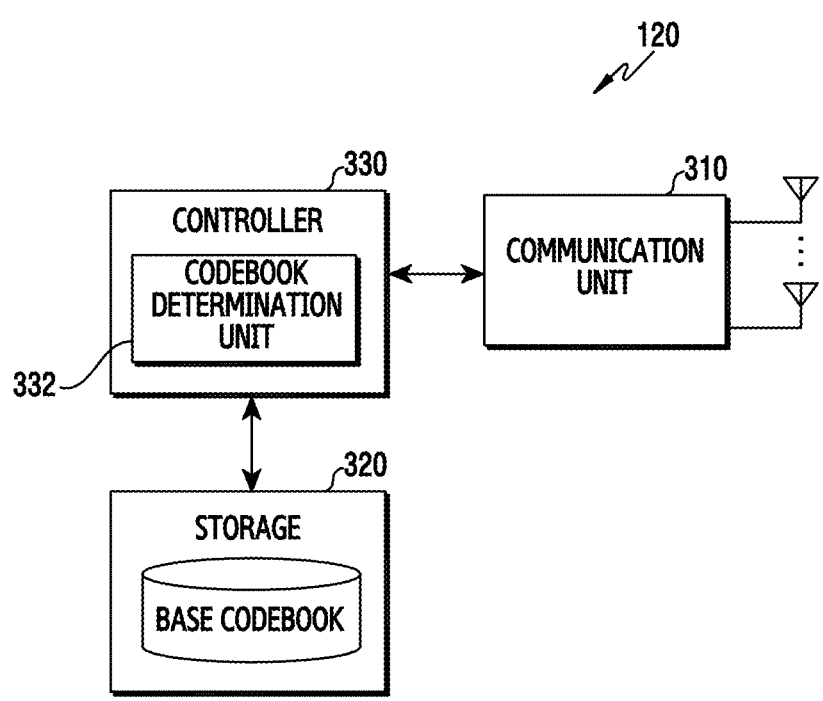
FIG. 3 is a view showing a configuration of a terminal in a wireless communication system according to various embodiments of the present disclosure.

FIG. 3 is a view showing a configuration of a terminal in a wireless communication system according to various embodiments of the present disclosure. The configuration illustrated in FIG. 3 may be understood as a configuration of any one of the terminals 120-128, and the terminal 120 will be described below as a representative. The term "unit" or terms ending with suffixes "-er," and "-or" used in the following description refer to a unit processing at least one function or operation, and may be implemented by hardware, software, or a combination of hardware and software.

Referring to FIG. 3, the terminal 120 may include a communication unit 310, a storage 320, and a controller 330.

The communication unit 310 performs functions for transmitting and receiving signals via a radio channel. For example, the communication unit 310 may perform a function of converting between a baseband signal and a bit string according to a physical layer standard of the system. For example, when transmitting data, the communication unit 310 may generate complex symbols by encoding and modulating a transmission bit string. In addition, when receiving data, the communication unit 310 may restore a reception bit string by demodulating and decoding a baseband signal. In addition, the communication unit 310 may up-convert a baseband signal into an RF band signal, and then may transmit the signal via an antenna, and may down-convert an RF band signal received via an antenna into a baseband signal. For example, the communication unit 310 may include a transmission filter, a reception filter, an amplifier, a mixer, an oscillator, a DAC, ADC, etc.

In addition, the communication unit 310 may include a plurality of transmission and reception paths. Furthermore, the communication unit 310 may include at least one antenna array including a plurality of antenna elements. In the hardware aspect, the communication unit 310 may include a digital unit and an analog unit (for example, a radio frequency integrated circuit (RFIC)). Herein, the digital circuit and the analogue circuit may be implemented by a single package. In addition, the communication unit 310 may include a plurality of RF chains. Furthermore, the communication unit 310 may perform beamforming.

The communication unit 310 may transmit and receive signals as described above. Accordingly, an entirety or a portion of the communication unit 310 may be referred to as a "transmitter," "receiver," or "transceiver." In addition, in the following description, transmitting and receiving via a radio channel may include processing by the communication unit 310 as described above.

The storage 320 may store data such as a basic program for the operation of the terminal 120, an application program, setting information, etc. The storage 320 may include a volatile memory, a nonvolatile memory, or a combination of a volatile memory and a nonvolatile memory. According to various embodiments, the storage 230 may store a base codebook. The base codebook may be at least one codebook related to a data signal, and may be used to generate another codebook related to a reference signal. In addition, the storage 320 provides stored data according to a request of the controller 330.

The controller 330 controls overall operations of the terminal 120. For example, the controller 330 may transmit and receive signals via the communication unit 310. In addition, the controller 330 may record or read out data on or from the storage 320. In addition, the controller 330 may perform functions of a protocol stack required by the communication standard. To achieve this, the controller 330 may include at least one processor or micro processor, or may be a portion of a processor. In addition, a portion of the communication unit 310 and the controller 330 may be referred to as a communication processor (CP). In particular, according to various embodiments, the controller 330 may control the terminal 120 to perform uplink transmission having at least one attribute of a grant-free and non-orthogonal multiple access. For example, the controller 330 may include a codebook determination unit 332 to determine at least one codebook to be used for a reference signal and a data signal. Herein, the codebook determination unit 332 may be a storage space storing, as a set of instructions or a code stored in the storage 320, an instruction/code at least temporarily resided in the controller 330, or an instruction/code, or may be a portion of a circuitry constituting the controller 330. For example, the controller 330 may control the terminal to perform operations according to various embodiments described below.

Figure 4:
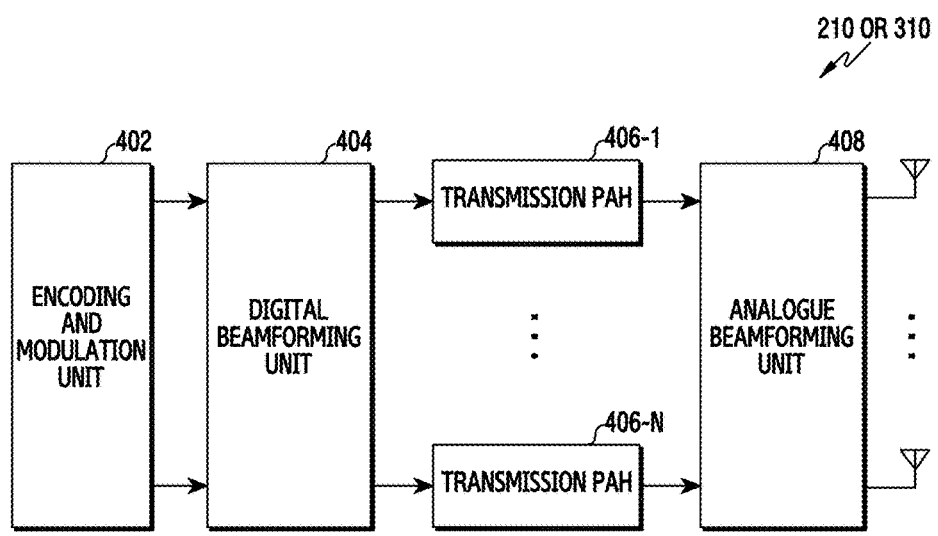
FIG. 4 is a view showing a configuration of a communication unit in a wireless communication system according to various embodiments of the present disclosure.

FIG. 4 is a view showing a configuration of a communication unit in a wireless communication system according to various embodiments of the present disclosure. FIG. 4 illustrates an example of a detailed configuration of the wireless communication unit 210 of FIG. 2 or the communication unit 310 of FIG. 3. Specifically, FIG. 4 illustrates elements for beamforming, as a portion of the wireless communication unit 210 of FIG. 2 or the communication unit 310 of FIG. 3.

Referring to FIG. 4, the wireless communication unit 210 or the communication unit 310 includes an encoding and modulation unit 402, a digital beamforming unit 404, a plurality of transmission paths 406-1 to 406-N, and an analog beamforming unit 408.

The encoding and modulation unit 402 performs channel encoding. For channel encoding, at least one of a low density parity check (LDPC) code, a convolution code, and a polar code may be used. The encoding and modulation unit 402 may generate modulation symbols by performing constellation mapping.

The digital beamforming unit 404 performs beamforming with respect to a digital signal (for example, modulation symbols). To achieve this, the digital beamforming unit 404 multiplies the modulation symbols with beamforming weights. Herein, the beamforming weights may be used to change a size and a phase of a signal, and may be referred to as a "precoding matrix," "precoder," etc. The digital beamforming unit 404 outputs the digital-beamformed modulation symbols to the plurality of transmission paths 406-1 to 406-N. In this embodiment, according to a multiple input multiple output (MIMO) transmission technique, the modulation symbols may be multiplexed or the same modulation symbols may be provided to the plurality of transmission paths 406-1 to 406-N.

The plurality of transmission paths 406-1 to 406-N may convert the digital-beamformed digital signals into analogue signals. To achieve this, each of the plurality of transmission paths 406-1 to 406-N may include an inverse fast Fourier transform (IFFT) operation unit, a cyclic prefix (CP) insertion unit, a DAC, an up-conversion unit. The CP insertion unit may be for an orthogonal frequency division multiplexing (OFDM) method, and may be excluded when another physical layer method (for example, a filter bank multi-carrier (FBMC)) is applied. That is, the plurality of transmission paths 406-1 to 406-N provides an independent signal processing process with respect to a plurality of streams generated by digital beamforming. However, according to an implementation method, a portion of the elements of the plurality of transmission paths 406-1 to 406-N may be shared.

The analog beamforming unit 408 performs beamforming with respect to an analogue signal. To achieve this, the digital beamforming unit 404 multiplies analog signals with beamforming weights. Herein, the beamforming weights may be used to change a size and a phase of a signal.

It is common that a procedure of requesting resources and obtaining an approval is required to perform uplink transmission. However, when low-power is used as in an mMTC service or emergency is used as in an URLL service, an accessing procedure including various steps may be inappropriate and ineffective in terms of control signaling overhead. Accordingly, researches on a grant-free multiple access that does not require a control signal to transmit data are being actively conducted. Furthermore, researches are expanding to researches on an active terminal detection technique for detecting an active terminal in a base station by using a transmitted signal without an accessing process, and to researches on a channel estimation technique and detection of data of active terminals.

Accordingly, various embodiments of the present disclosure suggest a non-orthogonal multiple access transmission technique for transmitting a huge amount of data by using a limited small number of resources, and technology for performing active user detection (AUD) and channel estimation (CE), and furthermore performing data detection by using a received signal. More specifically, according to an embodiment, the base station may include a transmission technique that shares a pre-defined codebook, unlike an existing technique of assigning a codebook to each user, and thus may select a terminal that is most likely to be activated in every existing iterative active terminal detection process, and may perform a time-domain channel impulse response estimation technique with respect to the selected terminal. Therefore, the base station may obtain a channel that has higher reliability than before the channel impulse response (CIR) estimation technique is used. Thereafter, the base station may remove a signal of the selected terminal from a received signal, and may iteratively perform the process of the active user detection and the channel estimation by using the removed signal. Through this, the present disclosure aims at enhancing the performance of active user detection and enhancing the performance of channel estimation, and finally aims at enhancing the performance of data detection. In particular, in an environment in which the number of terminals increases to hundreds of terminals or thousands of terminals like the mMTC service, good performance of active user detection is used, and channel estimation is not easy to perform. Accordingly, the present disclosure suggests technologies for maintaining performance in such an environment.

Figure 5:
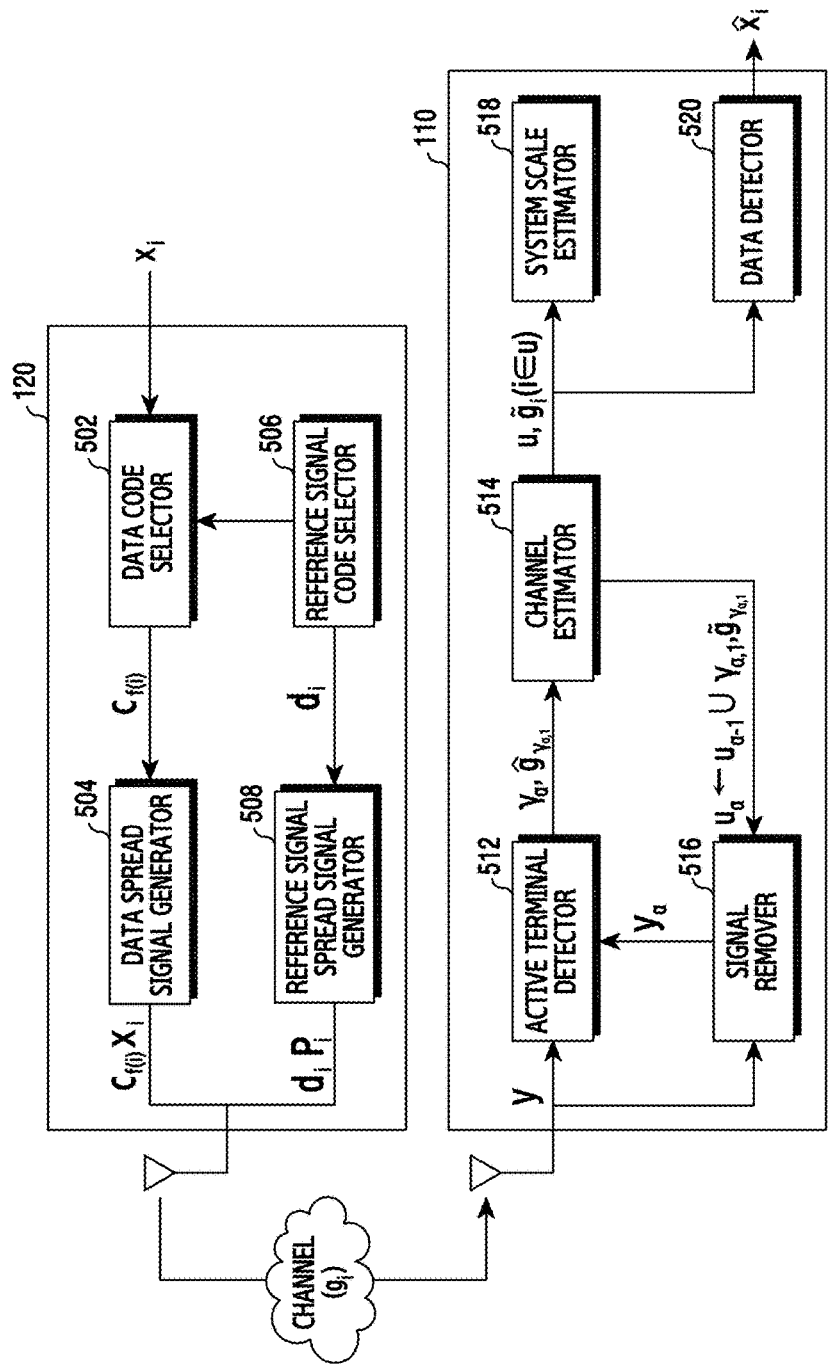
FIG. 5 is a view showing functional block configurations of a terminal and a base station in a wireless communication system according to various embodiments of the present disclosure.

FIG. 5 is a view showing functional block configurations of a terminal and a base station in a wireless communication system according to various embodiments of the present disclosure. FIG. 5 illustrates the functional block configurations of the terminal 120 and the base station 110. The term "unit" or terms ending with suffixes "-er," and "-or", as used herein, refer to a unit processing at least one function or operation, and may be implemented by hardware, software, or a combination of hardware and software.

Referring to FIG. 5, the terminal 120 includes a data code selector 502, a data spread signal generator 504, a reference signal code selector 506, and a reference signal spread signal generator 508. The data code selector 502 selects a code $C_{f(i)}$ to be applied to a data signal from a base codebook. Herein, the code may be referred to as a "sequence" or "signature." The data spread signal generator 504 may generate a data spread signal $C_{f(i)}x_i$ by spreading the data signal by using the code $C_{f(i)}$ selected by the data code selector 502. The reference signal code selector 506 may generate a codebook for a reference signal, based on the base codebook, and then may select a code $d_i$ for the reference signal. The reference signal spread signal generator 508 may generate a reference signal spread signal $d_i p_i$ by spreading the reference signal by using the code $d_i$ selected by the reference signal code selector 506. The generated data spread signal $C_{f(i)}x_i$ and the reference signal spread signal $d_i p_i$ may be transmitted to the base station 110 via a channel $g_i$.

Referring to FIG. 5, the base station 110 includes an active terminal detector 512, a channel estimator 514, a signal remover 516, a system scale estimator 518, and a data detector 520. The active terminal detector 512 may detect a reference signal of the active terminal (for example, the terminal 120) from a received signal y by using codes for spreading the reference signal. In addition, the active terminal detector 512 may transmit detected information regarding the active terminal, for example, an index $\gamma_\alpha$ and a frequency response vector $\hat{g}_{\gamma_{\alpha,1}}$, to the channel estimator 514. The channel estimator 514 may estimate a time-domain channel impulse response by using the detected information regarding the active terminal, and may convert the channel impulse response into a frequency response $\tilde{g}_{\gamma_{\alpha,1}}$ in the total frequency band, and then may determine a set of active terminals $u_\alpha$ detected in the α-th iteration by adding the frequency response $\tilde{g}_{\gamma_{\alpha,1}}$ and the index $\gamma_{\alpha,1}$ of the corresponding terminal to a set of active terminals $u_{\alpha-1}$ detected in the α–1-th iteration. The signal remover 516 may remove a signal from the detected active terminal from the received signal y. Thereafter, the active terminal detector 512 may detect another active terminal by using a signal $\gamma_{\alpha}$ from which a signal of the active terminal detected in the α-th iteration is removed. When the above-described iteration procedure is completed, the channel estimator 514 may transmit the set of active terminals u and channel information $\tilde{g}_i$ to the system scale estimator 518 and the data detector 520. The system scale estimator 518 may determine the number of active terminals or the number of potentially active terminals within a cell. Additionally, the system scale estimator 518 may transmit the number of active terminals or potentially active terminals in the cell to the terminal 120. The data detector 520 may detect data from the active terminals in the set of active terminals u by using the channel information $\tilde{g}_i$.

Figure 6:
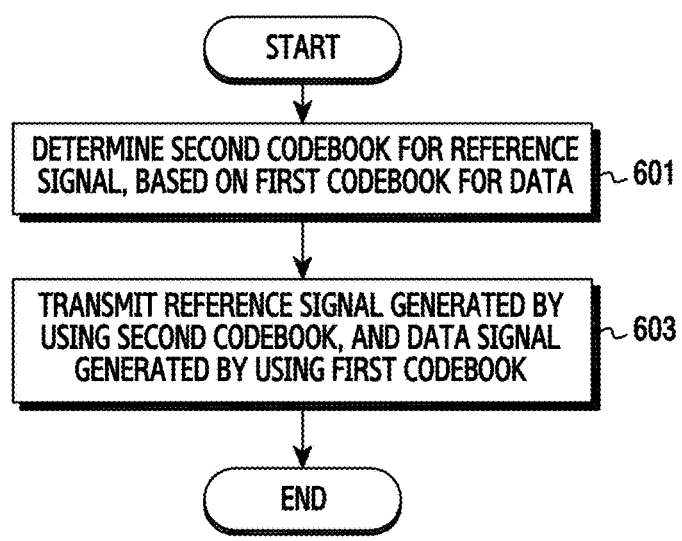
FIG. 6 is a view showing an operating method of a terminal transmitting uplink data in a wireless communication system according to various embodiments of the present disclosure.

FIG. 6 is a view showing an operating method of a terminal transmitting uplink data in a wireless communication system according to various embodiments. FIG. 6 illustrates an operating method of the terminal 120.

Referring to FIG. 6, in step 601, the terminal determines a second codebook for a reference signal, based on a first codebook for data. Herein, the first codebook includes a reference codebook for a data signal. The first codebook may be one that is selected from a plurality of codebooks. For example, the plurality of codebooks may be defined to have various sizes. In this embodiment, the terminal may use, as the first codebook, one of the plurality of codebooks that corresponds to the number of active terminals or potentially active terminals. The second codebook may be determined by extending the first codebook.

Next, in step 603, the terminal may transmit the reference signal generated by using the second codebook and the data signal generated by using the first codebook. Specifically, the terminal may select a first sequence for the data signal from the first codebook and select a second sequence for the reference signal from the second codebook, may spread the data signal and the reference signal by using the first sequence and the second sequence, and then may transmit the data signal and the reference signal during a given resource section (for example, at least one sub frame, at least one slot, etc.). In this embodiment, the reference signal may be transmitted via a resource that is shared by the plurality of terminals. In addition, according to an embodiment, the data signal may be transmitted via a resource determined by each terminal. In this embodiment, the terminal may determine a resource for transmitting the data signal by explicit signaling, or may derive a resource for transmitting the data signal based on at least one other parameter.

Figure 7:
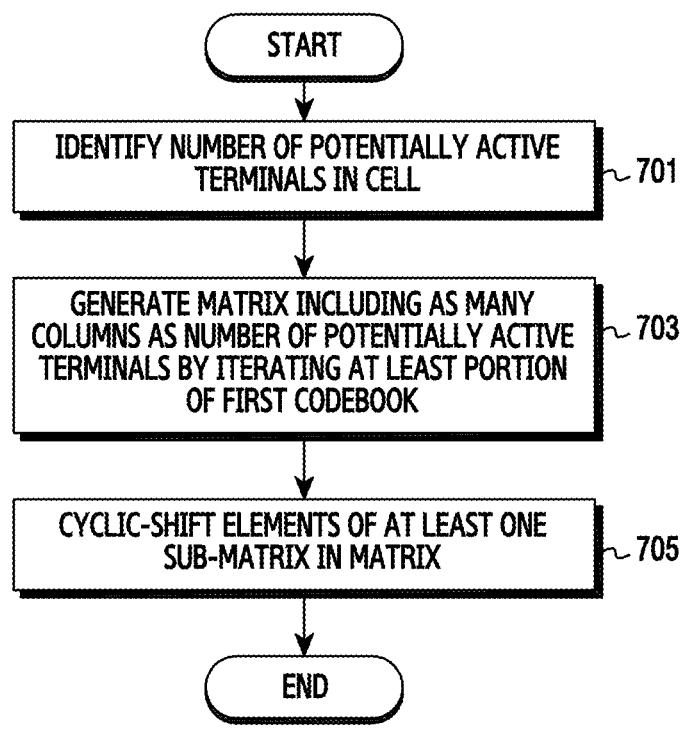
FIG. 7 is a view showing an operating method of a terminal determining a codebook in a wireless communication system according to various embodiments of the present disclosure.

FIG. 7 is a view showing an operating method of a terminal determining a codebook in a wireless communication system according to various embodiments of the present disclosure. FIG. 7 illustrates an example of an operating method of the terminal 120.

Referring to FIG. 7, in step 701, the terminal determines the number of potentially active terminals within a cell. According to an embodiment, the terminal may identify the number of potentially active terminals from information broadcasted by a base station (for example, the base station 110). That is, the terminal may receive information for determining the number of sequences to be included in the second codebook.

In step 703, the terminal may generate a matrix including as many columns as the number of potentially active terminals by iterating at least a portion of the first codebook. The second codebook may include a number of columns greater than or equal to the number of potentially active terminals. The terminal may generate a matrix including the necessary number of columns by iterating the first codebook on a column axis. In addition, the second codebook may include more rows than the first codebook in order to provide an orthogonality or quasi-orthogonality between sequences. The terminal may generate a matrix including the necessary number of rows by iterating the first codebook on a row axis.

In step 705, the terminal may cyclic-shift elements of at least one sub-matrix in the matrix. According to various embodiments, an application pattern of the cyclic shift may be defined diversely. According to an embodiment, the terminal may divide the matrix generated by iterating the first codebook into sub-matrixes each having a predetermined size, and may cyclic-shift the elements of each sub-matrix according to a corresponding value. For example, the sub-matrix may be defined to have the same size as that of the first codebook. In this embodiment, the second codebook may be determined by iterating the first codebooks to which different cyclic-shift values are applied on the row axis or column axis. In another example, the sub-matrix may be defined to have a size smaller than or larger than the first codebook.

Figure 8:
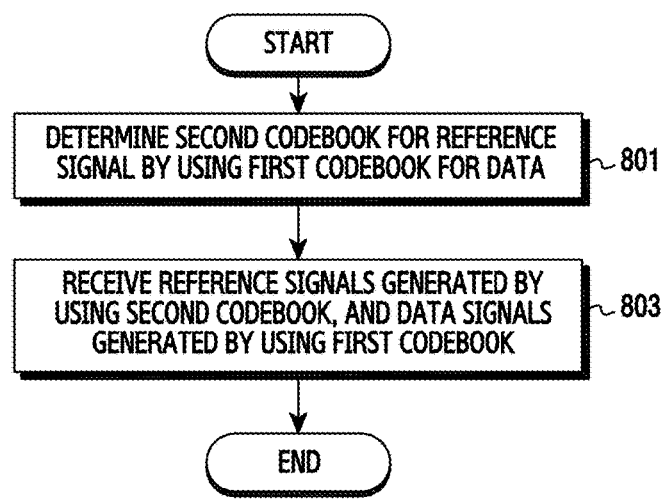
FIG. 8 is a view showing an operating method of a base station receiving uplink data in a wireless communication system according to various embodiments of the present disclosure.

FIG. 8 is a view showing an operating method of a base station receiving uplink data in a wireless communication system according to various embodiments of the present disclosure. FIG. 8 illustrates an example of an operating method of the base station 110.

Referring to FIG. 8, in step 801, the base station may determine a second codebook for a reference signal by using a first codebook for data. Herein, the first codebook includes a base codebook for a data signal. The first codebook may be one that is selected from a plurality of codebooks. For example, the plurality of codebooks may be defined to have various sizes. In this embodiment, the terminal may use, as the first codebook, one of the plurality of codebooks that corresponds to the number of active terminals or potentially active terminals. The second codebook may be determined by extending the first codebook. According to an embodiment, the base station may determine the second codebook according to the method illustrated in FIG. 7.

In step 803, the base station may receive reference signals generated by using the second codebook and data signals generated by using the first codebook. Specifically, the terminal may select a first sequence for the data signal from the first codebook and select a second sequence for the reference signal from the second codebook, may spread the data signal and the reference signal by using the first sequence and the second sequence, and then may transmit the data signal and the reference signal during a given resource section (for example, at least one sub frame, at least one slot, etc.). According to an embodiment, the reference signal may be received via a resource that is shared by the plurality of terminals. In addition, according to an embodiment, the data signal may be received via a resource determined by each terminal.

Figure 9:
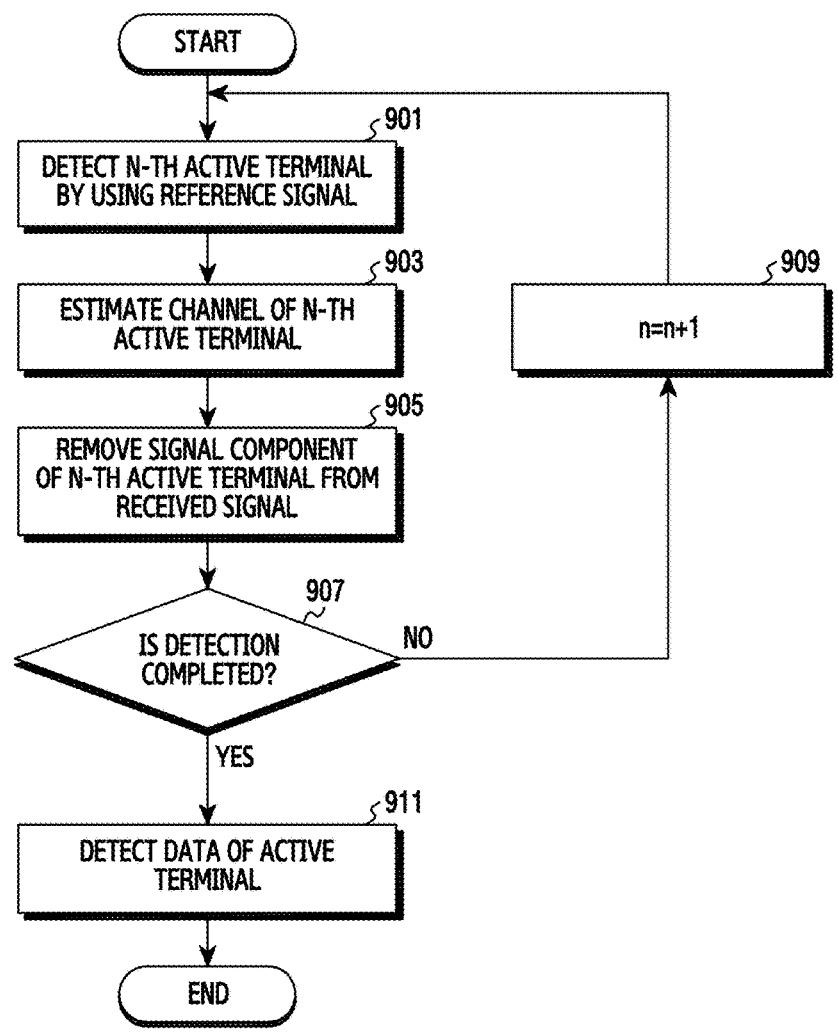
FIG. 9 is a view showing an operating method of a base station detecting uplink data in a wireless communication system according to various embodiments of the present disclosure.

FIG. 9 is a view showing an operating method of a base station detecting uplink data in a wireless communication system according to various embodiments of the present disclosure. FIG. 9 illustrates an example of an operating method of the base station 110. When the following procedure starts, n is initialized to 1.

Referring to FIG. 9, in step 901, the base station detects the n-th active terminal by using a reference signal. The active terminal may be detected according to various techniques. For example, the base station may use a correlation or a compressive sensing (CS) technique, or may use other algorithms. Specifically, the base station may perform the correlation with respect to a received signal by using sequences within a codebook for the reference signal, and may detect the active terminal based on the calculated correlation values.

In step 903, the base station estimates a channel of the n-th active terminal. Specifically, the base station may estimate a frequency-domain channel of the n-th active terminal, and may convert the frequency-domain channel information into time-domain channel information, that is, into a channel impulse response.

In step 905, the base station may remove a signal component of the n-th active terminal from the received signal. Specifically, the base station may convert the channel impulse response into a frequency response of the total band, and may extract a frequency response of a reference signal region from the frequency response of the total band. In addition, the base station may subtract a product of the frequency response of the reference signal region and the reference signal from the received signal.

In step 907, the base station may determine whether detection is completed. For example, the base station may determine whether detection is completed according to whether the number of detected active terminals reaches a threshold. In another example, the base station may perform the correlation by using the sequences, and may determine whether detection is completed according to whether the correlation value is less than a threshold. When detection is not completed, the base station may increase the number n by 1 in step 909 and return to step 901.

When detection of the active terminals is completed, the base station detects data of the detected active terminals in step 911. In this embodiment, the base station may detect data by using sequences in the codebook for a data signal.

As in the above-described embodiments, the terminal and the base station may generate a codebook for a reference signal by using a codebook for data, and may use the codebook to transmit and receive the reference signal and the data signal. In addition, the base station may effectively detect the active terminals by iteratively detecting the active terminals and removing interference, and may detect data. By doing so, the system according to various embodiments can support an uplink resource request and grant-free rapid uplink transmission.

Hereinafter, the above-described uplink transmission and detection procedure will be described in more detail with reference to the drawings and equations. In the following description, a case in which active terminals are detected according to the compressive sensing technique is illustrated.

A plurality of active terminals may transmit uplink data in a given resource section. Each of the active terminals may determine an extended codebook for a reference signal from a base codebook for data, and may spread a data signal and a reference signal by using the base codebook and the extended codebook. The spread data signal and reference signal may be mapped onto a data region and a reference signal region, respectively, and may be transmitted.

Figure 10:
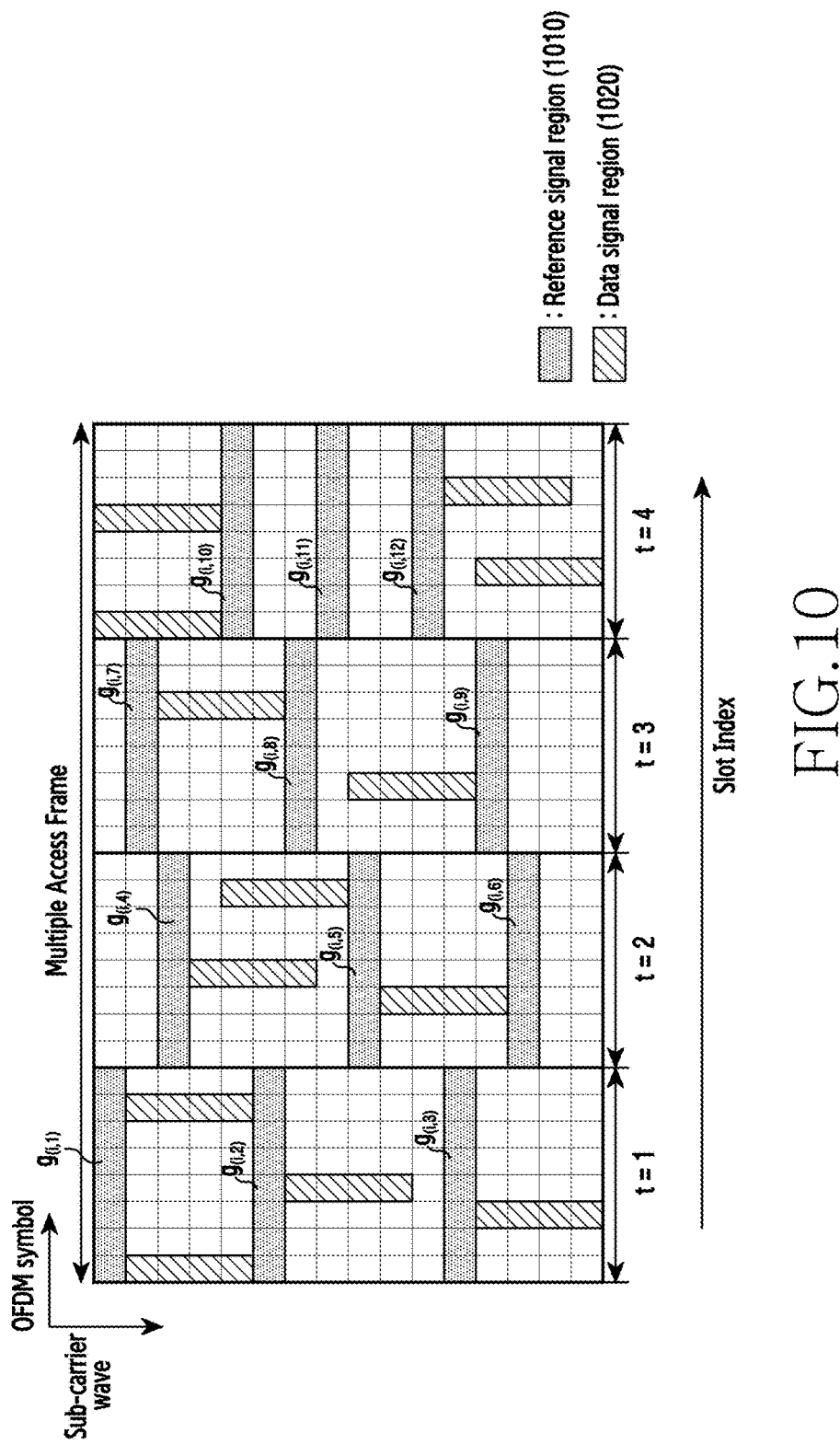
FIG. 10 is a view showing an example of mapping uplink signals in a wireless communication system according to various embodiments of the present disclosure.

FIG. 10 is a view showing an example of mapping uplink signals in a wireless communication system according to various embodiments of the present disclosure. In FIG. 10, the horizontal axis indicates an OFDM symbol, and the vertical axis indicates a sub-carrier wave. In FIG. 10, arrangements of a reference signal region 1010 and a data signal region 1020 may vary according to various embodiments. However, the active terminals may share the arranged regions during the same resource section. Referring to FIG. 10, the reference signal region 1010 may be assigned over all time axes within the resource section, and may occupy some sub-carrier waves on the frequency axis. The sub-carrier waves occupied by the reference signal region 1010 may vary according to a slot. In the case of FIG. 10, each sub-region of the reference signal region 1010 occupies eight (8) resource elements (REs), and one sub-region may correspond to one sequence (for example, one column of the second codebook). The data signal region 1020 may occupy a portion of the other regions except for the reference signal region 1010. In the case of FIG. 10, each sub-region of the data signal region 1020 may occupy four (4) REs, and one sub-region may correspond to one sequence (for example, one column of the first codebook).

Information regarding the assignment of the reference signal region 1010 may be pre-defined, or may be broadcasted through system information (for example, a master information block (MIB), a system information block (SIB), etc.) of the base station. For example, information regarding the arrangement of the reference signal region 1010 may include information indicating at least one of a length (for example, 8) of each sub-region and a sub-carrier wave gap (for example, 4) between the sub-regions.

The reference signal region 1010 may be shared by the active terminals in the same resource section. That is, the reference signals of the active terminals may be overlappingly received through the same reference signal region 1010. The data signal region 1020 may be assigned differently according to each terminal. In the mapping as shown in FIG. 10, a data signal may be independently demodulated in each region, and a reference signal may be demodulated by using all of the regions. Accordingly, the sub-regions included in the reference signal region 1010 may be distinguished by using indexes 1 to R (for example, 12).

In the example of FIG. 10, a resource assigned to the reference signal region 1010 and the data signal region 1020 may include four slots. That is, in the example of FIG. 10, the base station assigns a resource section including four slots for the sake of multiple access of the active terminals. However, according to another embodiment, a resource section including three or less or five or more slots may be assigned for the sake of multiple access. In other words, the length of the time axis of the resource section may vary according to various factors.

A data signal received at the base station through the data signal region 1020 as shown in FIG. 10 may be expressed by Equation 1 presented blow:

$$Z = \sum_{i=1}^{N} \text{diag}(g_i^{(d)}) c_{f(i)} x_i + v'$$

Equation 1

In Equation 1, z is a vector of a received data signal, $g_i^{(d)}$ is a channel of the i-th terminal, $c_{f(i)}$ is a sequence for data of the i-th terminal, $x_i$ is transmission data of the i-th terminal, and v' is a noise vector.

A reference signal received at the base station through the reference signal region 1010 as shown in FIG. 10 may be expressed by Equation 2 presented below:

$$y_r = \sum_{i=1}^{N} d_{r,i} g_{(i,r)} p_i + v_r = D_r G_r p + v_r$$

Equation 2

In Equation 2, $y_r$ is a vector of a received reference signal in a sub-region having an index r, $d_{r,i}$ is a sequence for the reference signal in the r-th sub-region of the i-th terminal, $g_{(i,r)}$ is a channel gain in the r-th sub-region of the i-th terminal, $p_i$ is a reference signal symbol, $D_r$ is a codebook for a reference signal, $G_r$ is a channel matrix, p is reference signal symbols, and $v_r$ is a noise vector.

Figure 11:
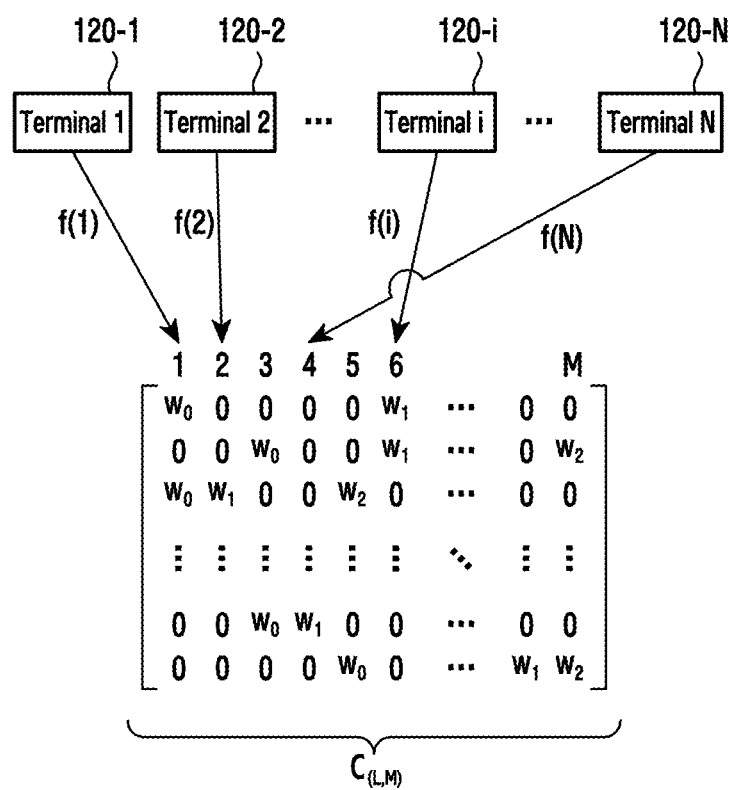
FIG. 11 is a view showing an example of selecting a sequence for data of active terminals in a wireless communication system according to various embodiments of the present disclosure.

A sequence for data, that is, a code for data transmission, may be selected from a base codebook $C_{(L,M)}$ shared by all terminals. FIG. 11 is a view showing an example of selecting a sequence for data of active terminals in a wireless communication system according to various embodiments of the present disclosure. Referring to FIG. 11, each of the N number of terminals 120-1 to 120-N selects one of the columns in the base codebook. A column vector f(i) indicating the selected column may be used as a sequence for spreading a data signal. For example, the base codebook may be a single low density signature (LDS) codebook.

A codebook for a reference signal may be generated from the base codebook. The codebook for the reference signal may be generated by deforming the base codebook according to the total number of terminals, that is, the number of potentially active terminals. For example, the codebook for the reference signal may be expressed by Equation 3 presented below:

$$D_{(KL,N)} = \begin{bmatrix} C_{(L,M)}^{(1)} & \cdots & C_{(L,M)}^{(j)} & \cdots & C_{(L,M)}^{(M^{K-1})} \\ C_{(L,M)}^{(1)} & \cdots & C_{(L,M)}^{(\lceil j/M \rceil)} & \cdots & C_{(L,M)}^{(M^{K-2})} \\ C_{(L,M)}^{(1)} & \cdots & C_{(L,M)}^{(\lceil j/M^2 \rceil)} & \cdots & C_{(L,M)}^{(M^{K-3})} \\ \vdots & \vdots & \vdots & \vdots & \vdots \\ C_{(L,M)}^{(1)} & \cdots & C_{(L,M)}^{(1)} & \cdots & C_{(L,M)}^{(1)} \end{bmatrix}_{(1:N)}$$

Equation 3

In Equation 3, $D_{(KL,N)}$ is a codebook for a reference signal, $C_{(L,M)}^{(j)}$ is a matrix that is obtained by cyclic-shifting the total columns of $C_{(L,M)}$ to the right or left by j columns, and $[\bullet]_{(1:N)}$ a is a matrix that is obtained by extracting $1^{st}$ to N-th columns from a corresponding matrix.

In a specific example, when KL=8 and N=20, an example of the codebook for the reference signal may be expressed by Equation 4 presented below:

Equation 4

$$D_{(8,20)} = \begin{bmatrix} \begin{bmatrix} 0 & w_0 & w_1 & w_2 & 0 & 0 \\ 0 & w_0 & 0 & 0 & w_1 & w_2 \\ w_2 & 0 & w_0 & 0 & w_1 & 0 \\ w_2 & 0 & 0 & w_0 & 0 & w_1 \\ 0 & w_0 & w_1 & w_2 & 0 & 0 \\ 0 & w_0 & 0 & 0 & w_1 & w_2 \\ w_2 & 0 & w_0 & 0 & w_1 & 0 \\ w_2 & 0 & 0 & w_0 & 0 & w_1 \end{bmatrix} \begin{bmatrix} 0 & 0 & w_0 & w_1 & w_2 & 0 \\ w_2 & 0 & w_0 & 0 & 0 & w_1 \\ 0 & w_2 & 0 & w_0 & 0 & w_1 \\ w_1 & w_2 & 0 & 0 & w_0 & 0 \\ 0 & w_0 & w_1 & w_2 & 0 & 0 \\ w_0 & 0 & 0 & w_1 & w_2 & 0 \\ w_2 & 0 & w_0 & 0 & w_1 & 0 \\ w_2 & 0 & 0 & w_0 & 0 & w_1 \end{bmatrix} \begin{bmatrix} 0 & 0 & 0 & w_0 & w_1 & w_2 \\ w_1 & w_2 & 0 & w_0 & 0 & 0 \\ w_1 & 0 & w_2 & 0 & w_0 & 0 \\ 0 & w_1 & w_2 & 0 & 0 & w_0 \\ 0 & w_0 & w_1 & w_2 & 0 & 0 \\ 0 & w_0 & 0 & 0 & w_1 & w_2 \\ w_2 & 0 & w_0 & 0 & w_1 & 0 \\ w_2 & 0 & 0 & w_0 & 0 & w_1 \end{bmatrix} \begin{bmatrix} w_2 & 0 \\ 0 & w_1 \\ 0 & w_1 \\ w_0 & 0 \\ 0 & w_0 \\ 0 & w_0 \\ w_2 & 0 \\ w_2 & 0 \end{bmatrix} \end{bmatrix}$$

In Equation 4, $D_{(KL,N)}$ is a codebook for a reference signal.

As described above, by generating the codebook for the reference signal, different reference signal transmission codes may be assigned to all of the potentially active terminals. In an embodiment, one codebook may be used for the sub-regions of the reference signal region 1010. According to another embodiment, different codebooks may be used for the sub-regions of the reference signal region 1010. In this embodiment, with respect to each sub-region, the codebook for the reference signal may be cyclic-shifted according to a value corresponding to the index of each sub-region. For example, the codebook for the sub-region of the index r may be defined as $D_r = D_{(KL,N)}^{(r)}$.

When the active terminals transmit data signals and reference signals through the above-described process, the base station may detect the active terminals and estimate channels through an iterative procedure. In the first step of the a-th iteration, the base station may provisionally detect the active terminals, and may estimate indexes $\gamma_\alpha$ of the provisionally detected active terminals and a frequency response ĝ of the reference signal region. In the second step of the α-th iteration, the base station may perform channel estimation with respect to a terminal of the index $\gamma_{\alpha,1}$ that is detected first as a potentially active terminal because the terminal is mostly likely to be activated from among the provisionally detected active terminals. The base station may estimate a time-domain channel impulse response by utilizing the frequency response vector $\hat{g}_{\gamma_{\alpha,1}}$ which is estimated in the first step with respect to the terminal of the index $\gamma_{\alpha,1}$, and then, may estimate a frequency response $\tilde{g}_{\gamma_{\alpha,1}}$ in the total frequency band by performing FFT. In addition, the base station may add the index $\gamma_{\alpha,1}$ to an index vector $u_\alpha$ which is finally determined as an active terminal. Thereafter, in the third step, the base station may extract a frequency response $\hat{g}_{\gamma_{\alpha,1}}$ of the reference signal region from the estimated frequency response $\tilde{g}_{\gamma_{\alpha,1}}$, and then may remove a signal of the terminal of the index $\gamma_{\alpha,1}$ from a received signal $y=[y_1^T \ldots y_R^T]^T$. When the values of the vector $u_\alpha$ are finally equal to the number of active terminals $N_e$ estimated at a receiving end by iterating the first to third steps, the iteration process is finished. An example of the above-described iterative process will be described with reference to FIG. 12.

Figure 12:
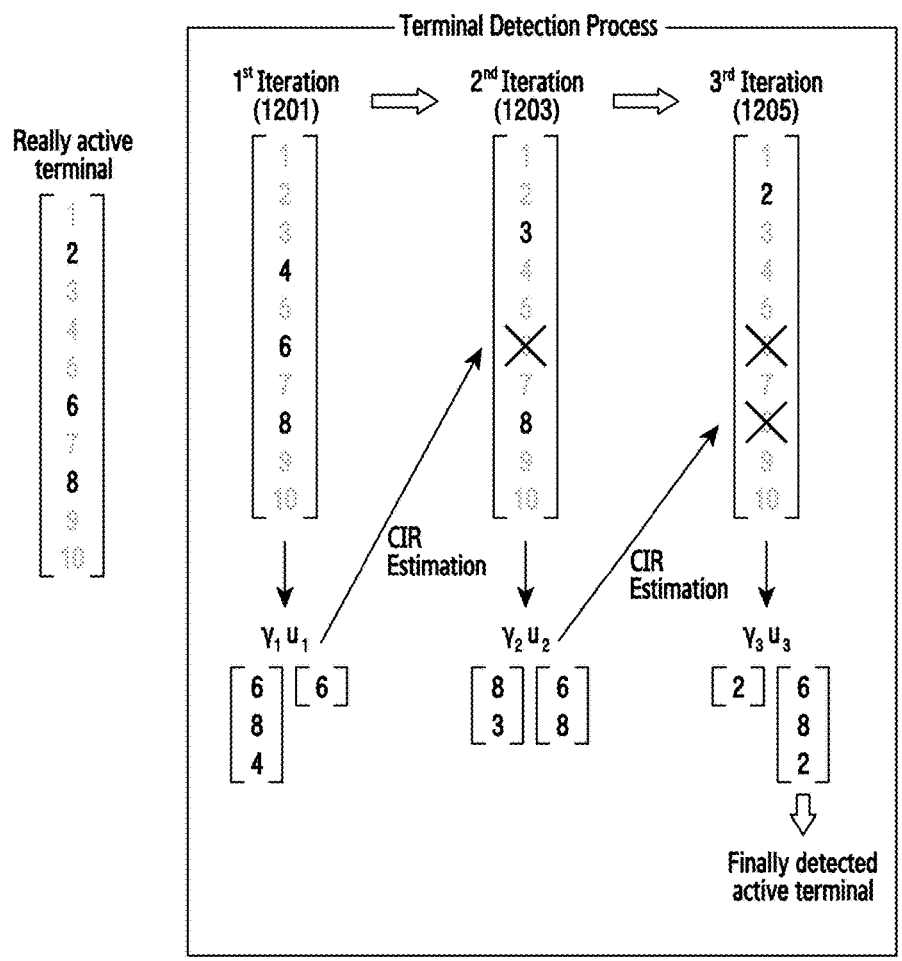
FIG. 12 is a view showing an example of a procedure of detecting an active terminal in a wireless communication system according to various embodiments of the present disclosure.

FIG. 12 is a view showing an example of a procedure of detecting an active terminal in a wireless communication system according to various embodiments of the present disclosure. Referring to FIG. 12, really active terminals may be terminals of indexes 2, 6, 8. In the first iteration 1201, the base station may detect terminals of indexes 4, 6, 8 as potentially active terminals, and then may select the terminal of the index 6 that has the highest probability. Accordingly, the base station may estimate a channel impulse response regarding the terminal of the index 6, and then may remove a signal component of the terminal of the index 6 from a received signal. Similarly, in the second iteration 1203, the base station may detect terminals of indexes 8, 3 as potentially active terminals, and then may select the terminal of the index 8 having the highest probability, and may estimate a channel impulse response regarding the terminal of the index 8 and then may further remove a signal component of the terminal of the index 8 from the received signal. Finally, in the third iteration 1205, the base station may detect a terminal of the index 2 as a potentially active terminal, and then may select the terminal of the index 2 having the highest probability. As a result, the terminals of the indexes 6, 8, 2 may be detected as active terminals.

If an algorithm of the above-described iterative active terminal detection and channel estimation is arranged, the algorithm may be arranged as in Table 1 presented below:

TABLE 1

Algorithm 1: Compressive sensing-based joint active terminal
detection and channel estimation
Algorithm 1 CS-based joint active user detection and channel estimation Input: $y \in \mathbb{C}^{KLR \times 1}$ (received pilot vector), D (codebook for pilot
  transmission) $N_e$ (estimated number of active user)
  Initialization $\alpha = 0$, $y_0 = y$, $u_0 = \emptyset$
  for $\alpha = 1 : N_e$ do
    Step 1 (Active User Detection & Frequency Response Estimation)
      $N_r = N_e - \alpha + 1$
      Input : $y_{\alpha-1}$, $N_r$
      Do the Algorithm 2
      Output : $\gamma$, $\hat{g}_i$ ($i \in \gamma$)
      $\gamma_\alpha = \gamma$
    Step 2 (Channel Impulse Response Estimation)
      Input : $\hat{g}_{\gamma_\alpha,1}$
      Do the Algorithm 3
      Output : $\bar{g}_{\gamma_\alpha,1}$
      $u_\alpha = u_{\alpha-1} \cup \gamma_{\alpha,1}$
    Step 3 (Cancellation)
      $y_\alpha = y - \Sigma_{i \in u_\alpha} \text{diag}(d_{1,i}, \ldots, d_{R,i}) \, \text{diag}(\hat{g}, p_i)$
  end for
  With the indices set $uN_e$, do the frequency response estimation with
  LMMSE and CIR estimation for all users in $u_{N_e}$.
Output: $u = u_{N_e}$ (finally estimated active users' index)
  $\hat{g}_i$, $i \in u$ (estimated frequency response for entire frame)

Referring to Table 1, a received signal y, a codebook D for a reference signal, and the estimated total number of active terminals $N_e$ are provided as input variables. In the start step, the number of detected active terminal $\alpha=0$, an interference-removed received signal $y_0=y$, and an active terminal index collection vector $u_0$ may be initialized to a white space. In addition, the following three steps may be performed until $\alpha=N_e$.

In the first step, the base station may detect active terminals and estimate a frequency-domain channel. In addition, an update indicating that the $N_r$-th active terminal is being currently discovered ($N_r=N_e-\alpha+1$) may be provided, and the Algorithm 2 of Table 2 presented below may be performed (inputting $y_{\alpha-1}$, $N_r$). By doing so, the base station may update the active terminal index ($\gamma_\alpha=\gamma$), and may obtain a frequency-domain channel $\hat{g}_i$.

In the second step, the base station may estimate a time-domain channel. For example, the Algorithm 3 of Table 3 presented below is performed (inputting $\hat{g}_{\gamma_\alpha,1}$ and obtaining a time-domain channel $\bar{g}_{\gamma_\alpha,1}$). In addition, $u_\alpha$ is updated to include $\gamma_{\alpha,1}$.

In the third step, the base station may remove a signal of the estimated terminal. In other words, a signal component of the already estimated terminal is removed from the received signal.

Hereinafter, the process of detecting active terminals will be described in more detail. A reference signal received at the base station may be expressed by Equation 5 presented below:

$$y_r = D_r G_r p + v_r = D_r q_r + v_r \qquad \text{Equation 5}$$

In Equation 5, $y_r$ is a vector of a received reference signal in a sub-region of an index r, $D_r$ is a codebook for a reference signal, $G_r$ is a channel matrix, p is reference signal symbols, $v_r$ is a noise vector, and $q_r$ is a product of a channel value and a reference signal symbol.

When the received signal in the whole reference signal region is $y=[y_1^T \ldots y_R^T]^T$, the received signal may be expressed by Equation 6 presented below:

$$y = \text{diag}(D_1 \ldots, D_R) \begin{bmatrix} q_1 \\ \vdots \\ q_R \end{bmatrix} + \begin{bmatrix} v_1 \\ \vdots \\ v_R \end{bmatrix} \qquad \text{Equation 6}$$

In Equation 6, y is a vector of a reference signal in the whole reference signal region, $D_r$ is a codebook for a reference signal used in a sub-region of an index r, $q_r$ is a product of a channel value and a reference signal symbol, and $v_r$ is a noise in the sub-region of the index r.

The vector $[q_1^T \ldots q_R^T]^T$ is a form having vectors layered in the order of indexes of the whole region, and the vector $q_r$ is a form having signals of the first terminal to the final terminal, that is, the n-th terminal, layered one on another. When the above-described vector is rearranged in the index order of the whole terminals by using $w_i=[q_{1,i} \ldots q_{R,i}]^T$, the vector may be expressed by Equation 7 presented below:

$$y = [\Lambda_1 \ldots \Lambda_N] \begin{bmatrix} w_1 \\ \vdots \\ w_N \end{bmatrix} + \begin{bmatrix} v_1 \\ \vdots \\ v_R \end{bmatrix} \qquad \text{Equation 7}$$

In Equation 7, y is a vector of a received signal in the whole reference signal region, $\Lambda_N$ is a sensing matrix regarding a codebook that is rearranged in an index order of a terminal to correspond to $w_N$, and the n-th terminal, $w_N$ is a product of a channel value of the N-th terminal and a reference signal symbol, and $v_r$ is a noise in a channel of the r-th terminal.

Since the vector $[W_1^T \ldots W_N^T]^T$ can be modeled as a sparse vector in the re-arranged system, indexes and values of vectors rather than the zero-vector from among the vectors $w_N$ may be estimated according to the compressive sensing technique according to an embodiment. Herein, the zero-vector may refer to a vector in which values of all elements are 0 or a vector in which a sum of values of the elements is less than a threshold. A detailed algorithm of the compressive sensing technique is as in Table 2 presented below:

TABLE 2

Algorithm 2: Compressive sensing-based joint active terminal detection
and frequency response estimation Input: $y \in \mathbb{C}^{KLR \times 1}$ (received signal), $[\Lambda_1 \ldots \Lambda_N] \in \mathbb{C}^{(KLR) \times (RN)}$ (sensing
matrix), $N_r$ (estimated number of active user)
  Definition $a^k \in \mathbb{C}^{KLR \times 1}$ (residual signal vector at the kth iteration),
  $\delta^k \in \mathbb{C}^{N \times 1}$ (support vector at the kth iteration). $\hat{w}_i^k$ (LMMSE estimate
  of $w_i$ at the kth iteration).
  Initialization $a^0 = y$, $k = 0$, $\delta^0 = 0_N$, $\gamma = 0_{N_r}$
  while $\|\delta^k\|_0 < N_r$ do
    $k = k + 1$ TABLE 2-continued Algorithm 2: Compressive sensing-based joint active terminal detection and frequency response estimation $$s_{max} = \underset{s=1,\ldots,N}{\operatorname{argmax}} \|\Lambda_s^H a^{k-1}\|_2^2$$

(selection of index corresponding to largest inner product)
$\gamma_k = s_{max}$
$\delta^k = \delta^{k-1}$ but $\delta_{s_{max}}^k = 1$ (addition of new support)

$$\hat{w}_i^k = E[w_i y^H] E[yy^H]^{-1} y$$

$$= [\delta_i^k P_i \Lambda_i^H] \left[ \sum_{i=1}^{N} \delta_i^k P_i \Lambda_i \Lambda_i^H + \sigma_v^2 I \right]^{-1} y,$$

i = 1, ..., N (LMMSE estimation)

$a^k = y - \Sigma_{i=1}^{N} \Lambda_i \delta_i^k \hat{w}_i^k$ (residual update)
end while
$\hat{w}_i = \hat{w}_i^{N_r}$
Output: γ (set of estimated active user indices)
$\hat{g}_i = [\hat{g}_{(i,1)}, \ldots, \hat{g}_{(i,R)}]^T = \hat{w}_i/p$, i = 1, ..., N, (estimated frequency response vector).

Referring to Table 2, a received signal y, a sensing matrix $\Lambda_i$ and the estimated number of active terminals $N_r$ are provided as input variables. A residual vector $\alpha^0=1$, the number of found sparse signals k=0, a sparse signal position display vector $\delta^0=O_N$, a sparse signal index vector $\gamma=O_{N_r}$ are initialized. Thereafter, the following operations are performed until the number of found sparse signals reaches $N_r$. First, the base station may increase the k value, and find a position having the highest correlation with $a^{(k-1)}$ from among $\Lambda_i$ and may put the position in $\gamma_k$. In addition, the base station may update the sparse signal position display vector, may estimate a sparse signal value $\hat{w}_i^k$ through least minimum mean square error (LMMSE) estimation, and then may update the residual vector.

Figure 13:
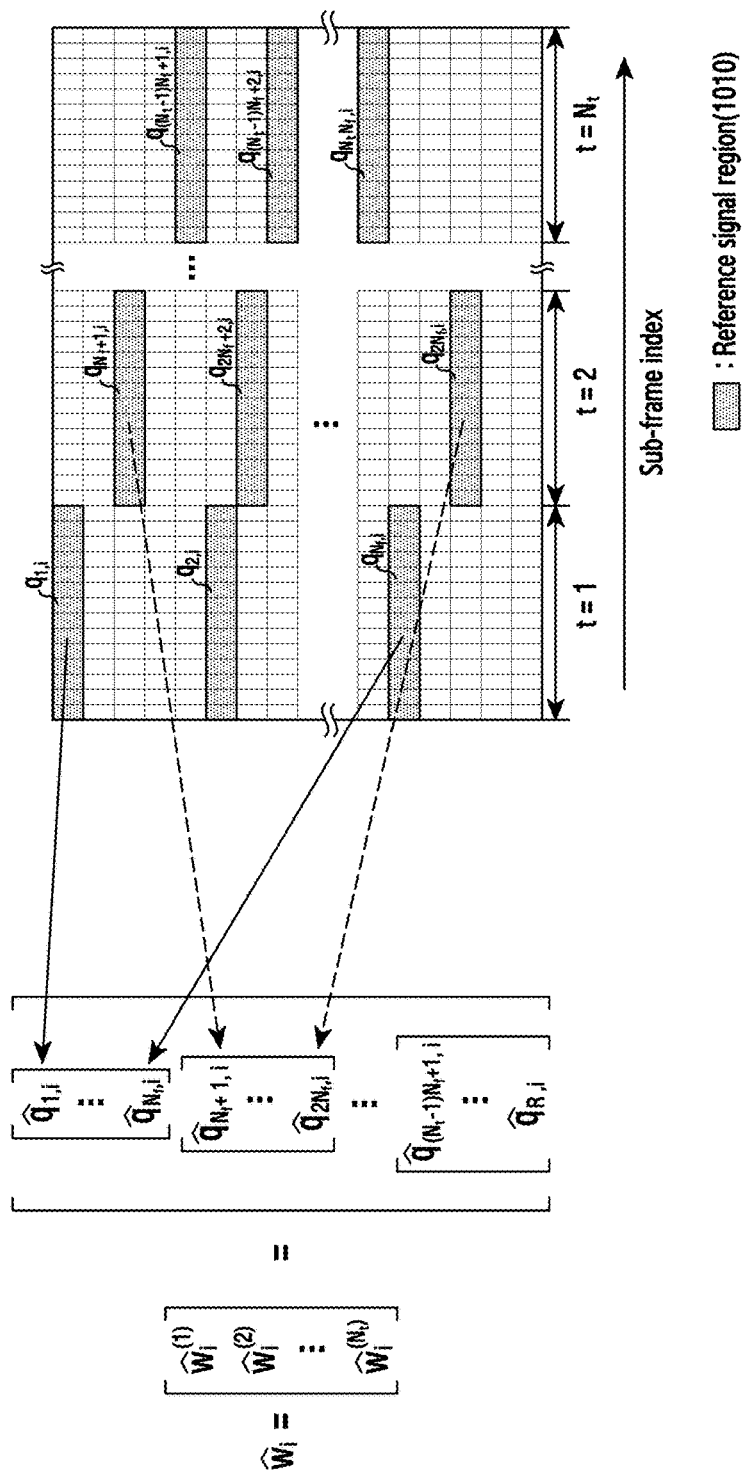
FIG. 13 is a view showing an example of estimating a channel impulse response in a wireless communication system according to various embodiments of the present disclosure.

After detecting the active terminals, the base station may estimate a time-domain channel impulse response by using the terminals estimated as active terminals and the estimated $\hat{g}$ (or $\hat{w}$). $\hat{w}_i$ which is estimated as a signal of the i-th terminal is arranged in the order of slot indexes like $[(\hat{w}_i^{(1)})^T \ldots (\hat{w}_i^{(N_t)})^T]^T$. An example of $\hat{w}_i$ is illustrated in FIG. 13. FIG. 13 is a view showing an example of estimating a channel impulse response in a wireless communication system according to various embodiments of the present disclosure. Referring to FIG. 13, values q indicating a product of a reference signal and a channel are classified according to each slot, wherein the reference signal is determined from signals received in the reference signal region 1010 within $N_t$ sub-frames. In addition, $\hat{w}_i$ may be configured by combining the vectors corresponding to each slot.

Figure 14:
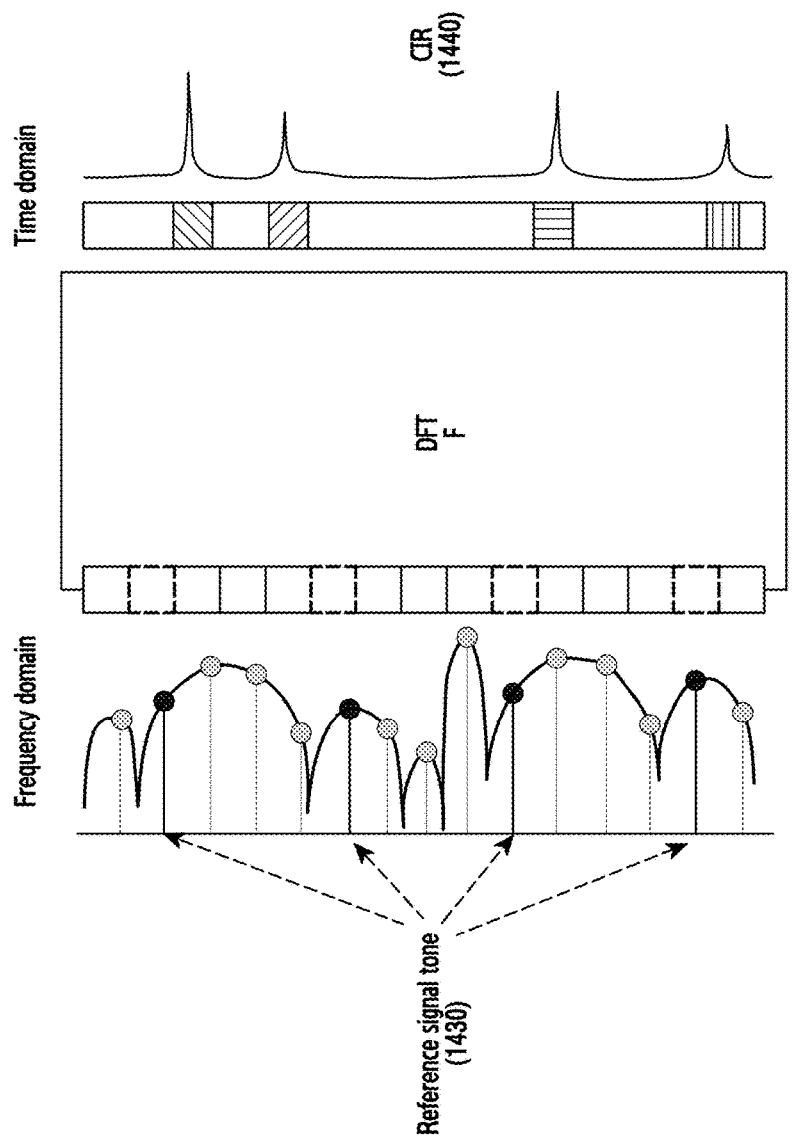
FIG. 14 is a view showing a relationship between reference signals and channel information in a wireless communication system according to various embodiments of the present disclosure.

A relationship between a value in the t-th slot and the channel impulse response is illustrated in FIG. 14. FIG. 14 is a view showing a relationship between reference signals and channel information in a wireless communication system according to various embodiments of the present disclosure. Referring to FIG. 14, tones 1430 for reference signals discontinuously exist in the frequency domain. Herein, the tone may be referred to as an "RE." A channel impulse response 1440 of the time domain may be induced from the result of estimating the reference signals in the frequency domain by an IFFT or inverse discrete Fourier transform (IDFT) operation. In order to induce the channel impulse response, the compressive sensing technique may be used. The relationship between the estimation value of the signal and the channel impulse response may be expressed by Equation 8 presented below:

$$\hat{w}_i^{(t)} = \underbrace{\operatorname{diag}(\tilde{p})\Phi^{(t)}\mathcal{F}_{N_{FFT}}\Pi}_{U^{(t)}} h_i^{(t)} + n_i^{(t)} \quad \text{Equation 8}$$

In Equation 8, $\hat{w}_i^{(t)}$ is an estimation value regarding a signal of the i-th terminal in the t-th slot, $\tilde{p}$ is a vector of reference signal symbols transmitted by a terminal in the reference signal region, $\Phi^{(t)}$ is a matrix indicating positions of reference signal regions in the t-th slot, $F_{N_{FFT}}$ is an FFT matrix, Π is a matrix indicating a position of a channel impulse response in the total FFT size, $h_i^{(t)}$ is a channel impulse response vector in the t-th slot, and $n_i^{(t)}$ is a noise in the t-th slot.

In Equation 8, when the residual matrix except for the channel impulse response vector is $u^{(t)}$, $\hat{w}_i$ may be expressed by Equation 9 presented below:

$$\hat{w}_i = \operatorname{diag}(U^{(1)}, \ldots, U^{(N_t)}) \begin{bmatrix} h_i^{(1)} \\ \vdots \\ h_i^{(N_t)} \end{bmatrix} + \begin{bmatrix} n_i^{(1)} \\ \vdots \\ n_i^{(N_t)} \end{bmatrix} \quad \text{Equation 9}$$

In Equation 9, $\hat{w}_i$ is an estimation value regarding a signal of the i-th terminal, $U^{(t)}$ is a residual matrix except for the channel impulse response vector, $h_i^{(t)}$ is a channel impulse response vector in the t-th slot, and $n_i^{(t)}$ is a noise in the t-th slot. The vector $$\left[(h_i^{(1)})^T \ldots (h_i^{(N_t)})^T\right]^T$$

is arranged in the order of slots. When the vector $$\left[(h_i^{(1)})^T \ldots (h_i^{(N_t)})^T\right]^T$$

is rearranged by using the vector $$m_j = \left[h_{i,j}^{(1)} \ldots h_{i,j}^{(N_t)}\right]^T,$$

$\hat{w}_i$ may be expressed by Equation 10 presented below:

$$\hat{w}_i = [\Sigma_1 \ldots \Sigma_{N_{CIR}}] \begin{bmatrix} m_1 \\ \vdots \\ m_{N_{CIR}} \end{bmatrix} + \begin{bmatrix} n_i^{(1)} \\ \vdots \\ n_i^{(N_t)} \end{bmatrix} \quad \text{Equation 10}$$

In Equation 10, $\hat{w}_i$ is an estimation value regarding a signal of the i-th terminal, $\Sigma_{N_{CR}}$ is a sensing matrix, $m_{N_{CR}}$ is a sparse vector, and $n_i^{(N_t)}$ is noise in the t-th slot.

Since the vector $$\left[m_1^T \ldots m_{N_{cR}}^T\right]^T$$

can be modeled to a sparse vector in the rearranged system model, indexes and values of vectors rather than the zero vector from among $m_n$ vectors may be estimated according to the compressive sensing technique. A detailed algorithm of the compressive sensing technique is as in Table 3 presented below.

TABLE 3

Algorithm 3: Compressive sensing-based time-domain channel impulse response estimation Input: $\hat{w}_i \in \mathbb{C}^{N_pN_t \times 1}$ (received signal), $[\Sigma_1 \ldots \Sigma_{N_{CIR}}] \in \mathbb{C}^{(N_pN_t) \times (N_{CIR}N_t)}$ (sensing matrix), $N_D$ (the number of dominant components of the CIR vector),
  Definition $a^k \in \mathbb{C}^{N_pN_t \times 1}$ (residual signal vector at the kth iteration),
  $\delta^k \in \mathbb{C}^{N_{CIR} \times 1}$ (support vector at the kth iteration), $\hat{m}_j^k$ (LMMSE estimate of $m_j$ at the kth iteration), $R_x$ (the auto-correlation matrix of x).
  Initialization $a^0 = \hat{w}_i$, k = 0, $\delta^0 = 0_{N_{CIR}}$
  while $\|\delta^k\|_0 < N_D$ do
    k = k + 1

$$S_{max} = \underset{S=1,\ldots,N_{CIR}}{\operatorname{argmax}} \left\| \sum_S^H a^{k-1} \right\|_2^2$$

(selection of index corresponding to largest inner product)
$\delta^k = \delta^{k-1}$ but $\delta_{S_{max}}^k = 1$ (addition of new support)

$$\hat{m}_j^k = E[m_j \hat{w}_i^H] E[\hat{w}_i \hat{w}_i^H]^{-1} \hat{w}_i$$

$$= \left[ \delta_j^k R_{m_j} \sum_j^H \left[ \sum_{j=1}^{N_{CIR}} \delta_j^k R_{m_j} \sum_j \sum_j^H + C_n \right]^{-1} \hat{w}_i,$$

j = 1, ..., $N_{CIR}$ (LMMSE estimation)

$a^k = \hat{w}_i - \Sigma_{j=1}^{N_{CIR}} \Sigma_j \delta_j^k \hat{m}_j^k$
end while
$\hat{h}_i^{(t)} = [\hat{m}_{1,t}^{N_D} \ldots \hat{m}_{N_{CIR},t}^{N_D}]^T$, t = 1, ..., $N_t$
Output: $\tilde{g}_i = [(\mathcal{F}_{N_{FFT}} \Pi \hat{h}_i^{(1)})^T \ldots (\mathcal{F}_{N_{FFT}} \Pi \hat{h}_i^{(N_t)})^T]^T$ (Estimated frequency response in entire pilot subframes)

$$\hat{\tilde{g}}_i = \left[ \left[ \Phi^{(1)} \mathcal{F}_{N_{FFT}} \Pi \hat{h}_i^{(1)} \right]^T \ldots \left[ \Phi^{(N_t)} \mathcal{F}_{N_{FFT}} \Pi \hat{h}_i^{(N_t)} \right]^T \right]^T$$

(Re-estimated frequency response for pilot regions)

Referring to table 3, a received signal $\hat{w}_i$, a sensing matrix $\Sigma_i$, and the number $N_D$ of dominant components of a channel impulse response are provided as input variables. A residual vector $\alpha^0 = \hat{w}_i$, the number of found sparse signals k=0, and a sparse signal position display vector $\delta^0 = 0_{N_{CR}}$ are initialized. The following operations are performed until the number of found sparse signals reaches $N_D$. The base station may increase the k value, and find a position having the highest correlation with $a^{(k-1)}$ from among $\Sigma_i$ and may update the sparse signal position display vector. Thereafter, the dominant component value $\hat{m}_j^k$ may be estimated through LMMSE estimation, and the residual vector may be updated. When the number of found sparse signals reaches $N_D$, an entire band channel estimation $\tilde{g}_i$ of the updated frequency domain is obtained through an FFT operation.

In the algorithm in table 3, a covariance matrix of the noise vector may be calculated by Equation 11 by LMMSE of the algorithm of Table 2 as follows:

$$C_n = E[w_i w_i^H] - E[w_i y^H] E[yy^H]^{-1} E[yw^H] \qquad \text{Equation 11}$$

In Equation 11, $C_n$ is a covariance matrix of a noise vector, $w_i$ is a signal of the i-th terminal, and y is a received signal.

After performing channel estimation through CIR estimation, the base station may obtain a frequency response $\tilde{g}$ of the total frequency band with respect to the active terminal, and may remove a signal of the terminal detected as the active terminal by using the frequency response.

After estimating the active terminals and channels regarding the active terminals by iteratively performing active user detection and channel estimation, the base station may detect data. When a received data signal is rearranged as a received signal regarding the active terminal, the data signal may be expressed by Equation 12 presented below:

$$Z = \Sigma_{i \in u} \operatorname{diag}(g_i^{(d)}) c_{f(i)} x_i + v' = G^{(d)} \odot C' x + v'. \qquad \text{Equation 12}$$

In Equation 12, z is a received signal regarding an active user that is obtained by arranging a received data signal, $G^{(d)} = [f_{u_1}^{(d)}, \ldots, g_{uN_e}^{(d)}]$ is a channel matrix of the active terminals, $$C' = [C_{f(u_1)}, \ldots, C_{f(u_{N_e})}]$$

is a code matrix for data transmission, x is a data symbol vector, and v' is a noise vector.

Figure 15:
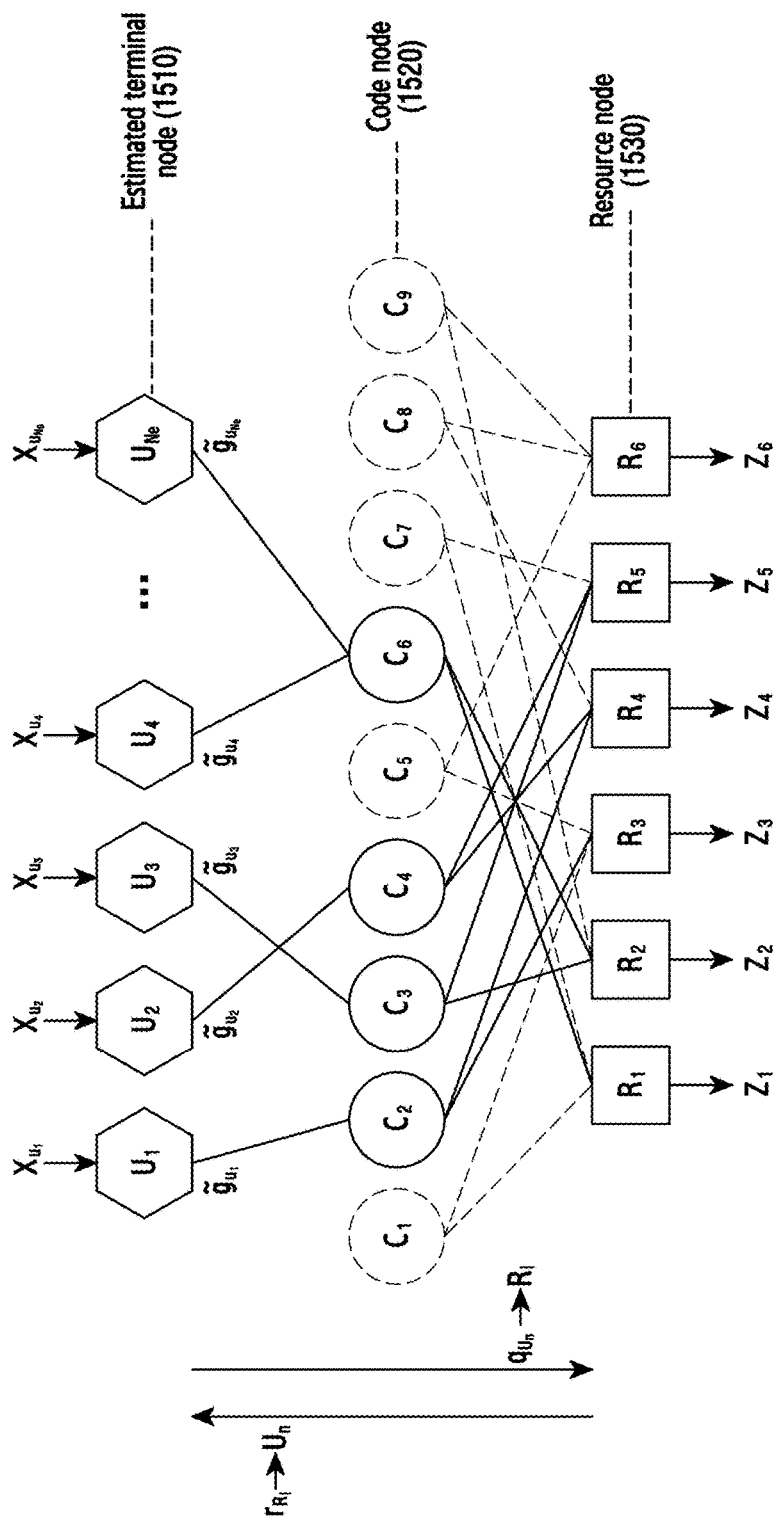
FIG. 15 is a view showing an example of a data detection procedure in a wireless communication system according to various embodiments of the present disclosure.

FIG. 15 is a view showing an example of a data detection procedure in a wireless communication system according to various embodiments of the present disclosure. FIG. 15 illustrates an example of a factor graph showing mapping patterns among terminals, codes, and resources by using active terminal information and code information. In FIG. 15, an estimated terminal node 1510 may correspond to terminals detected as active terminals, a code node 1520 may correspond to sequences in a codebook selected by the active terminals, and a resource node 1530 may correspond to resources transmitting data. Referring to FIG. 15, after generating the factor graph, the base station may detect data through a message passing algorithm (MPA) exchanging a probability value between the terminal node 1510 and the resource node 1530. A value transmitted from the resource node 1530 to the terminal node 1510 and a value transmitted from the terminal node 1510 to the resource node 1530 may be calculated by Equation 13 presented below:

$$r_{R_l \to U_n}^i(x) = \sum_{x^{[l]} : x_n = x} \left( G_l(x^{[l]}) \prod_{n' \in \xi_l, n} q_{U_{n'} \to R_l}^{i-l}(x_{n'}) \right) \qquad \text{Equation 13}$$

$$q_{U_n \to R_l}^i(x) = \gamma \prod_{l' \in \zeta_n, l} r_{R_{l'} \to U_n}^i(x)$$

In Equation 13, $R_l$ is the l-th resource node, $U_n$ is the n-th terminal node, $r_{R_l \to U_n}^i(x)$ is a value that is transmitted from the l-th resource node to the n-th terminal node, $G_l(x^{[l]})$ is a channel of a data symbol vector spread and transmitted from $R_l$, $q_{U_n \to R_l}^i(x)$ is a value that is transmitted from the n-th terminal node to the l-th resource node, $x^{[l]}$ is a vector of a data symbol spread and transmitted from the resource $R_l$, $\xi_l$ is a set of indexes of terminals spreading and transmitting data, $\zeta_n$ is a set of indexes of resources through which codes of terminals of the set $u_n$, are spread and $\gamma$ is a normalization factor.

The channel of the data symbol vector spread and transmitted from $R_l$ may be expressed by Equation 14 presented below:

$$G_l(x^{[l]}) = \exp\left(-\frac{1}{2\sigma^2}\left\|z_l - (g^{[l]} \Box c^{[l]})^T x^{[l]}\right\|^2\right) \quad \text{Equation 14}$$

In Equation 14, $G_l(x^{[l]})$ is a channel of a data symbol vector that is spread and transmitted from $R_l$, $x^{[l]}$ is a vector of a data symbol spread and transmitted from the resource $R_l$, $g^{[l]}$ is a vector including components rather than 0 of the first row in $G^{(d)}$, $c^{[l]}$ is a vector including components rather than 0 of the first row in c'.

After the iterative message transmission process, a symbol that has the highest probability is finally detected as a transmission symbol by Equation 15 presented below:

$$\hat{x}_n = \underset{x}{\arg\max}\left(\prod_{l \in \zeta_n} r^i_{R_l \to U_n}(x)\right) \quad \text{Equation 15}$$

In Equation 15, $\hat{x}_n$ is a transmission symbol, $\zeta_n$ is a set of indexes of resources through which codes of terminals in the set $u_n$ are spread, and $r_{R_l \to U_n}^i(x)$ is a value that is transmitted from the resource node to the terminal node.

FIGS. 16A to 16G are views showing results of simulating performance of the wireless communication system according to various embodiments of the present disclosure.

Figure 16A:
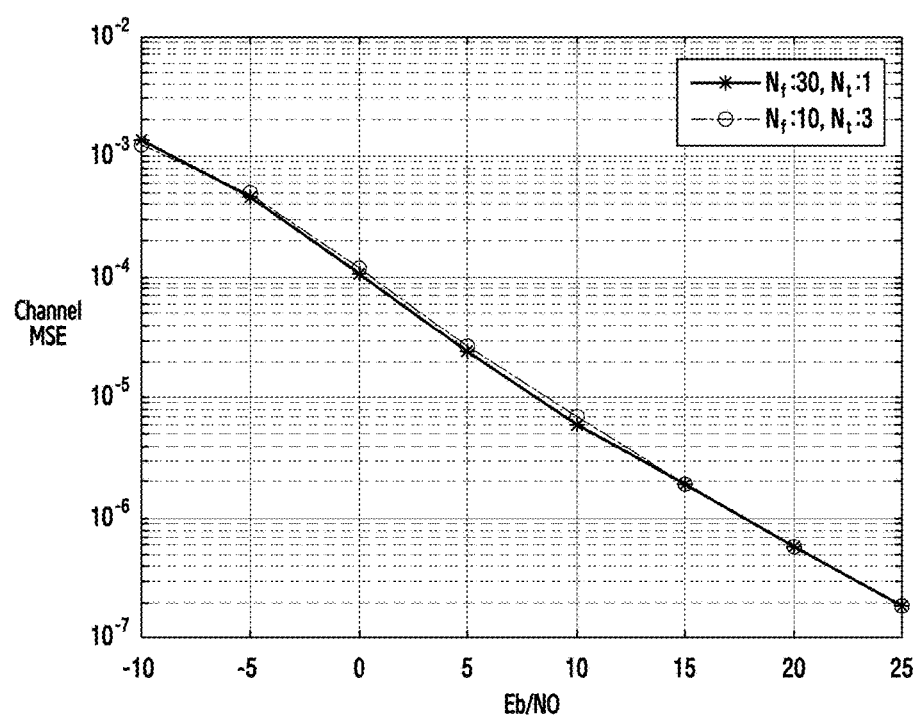
FIGS. 16A to 16G are views showing results of simulating performance of a wireless communication system according to various embodiments of the present disclosure.
Figure 16B:
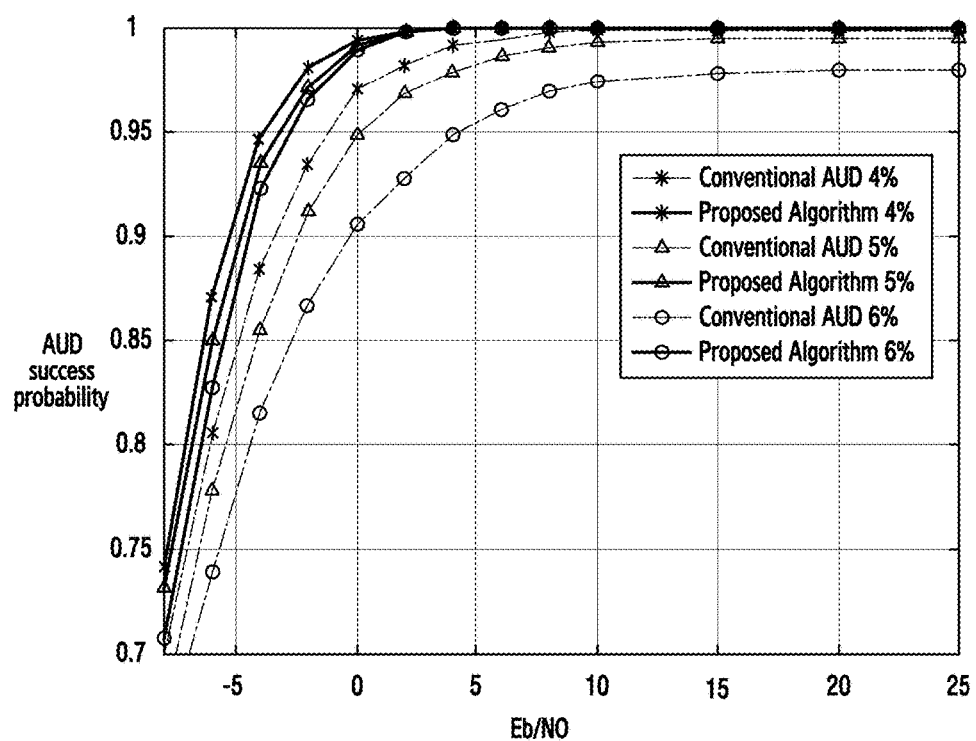
Figure 16C:
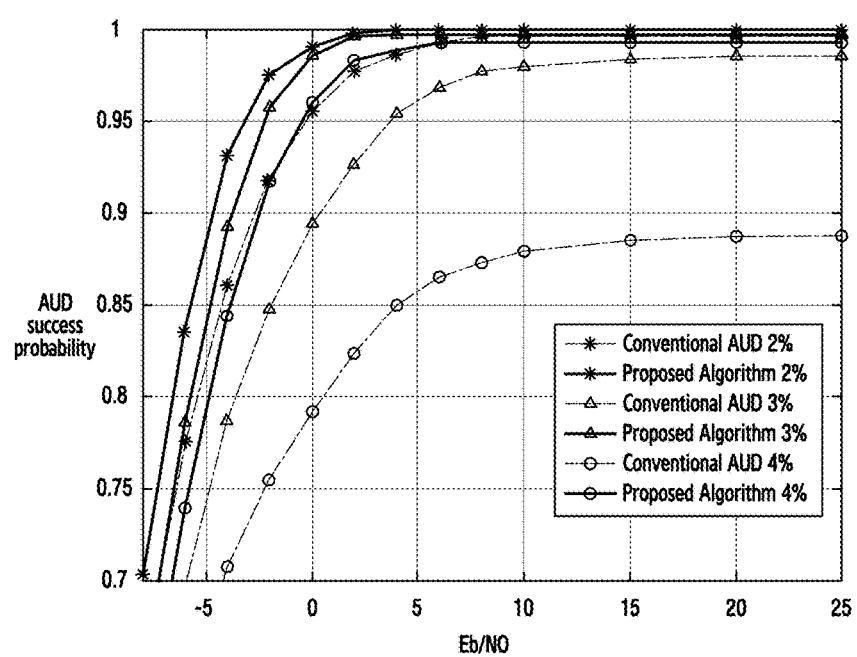
Figure 16D:
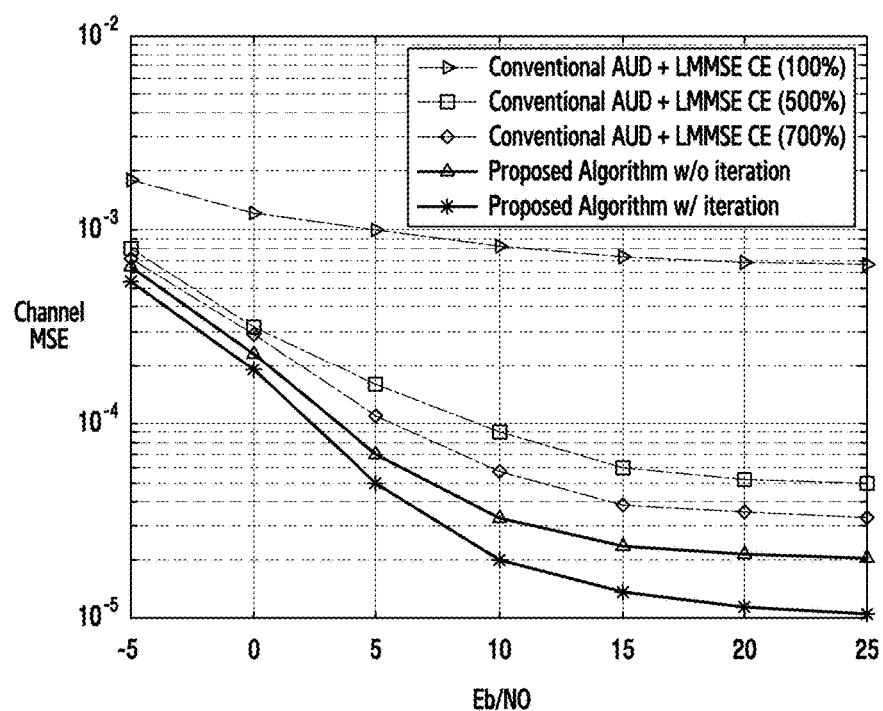
Figure 16E:
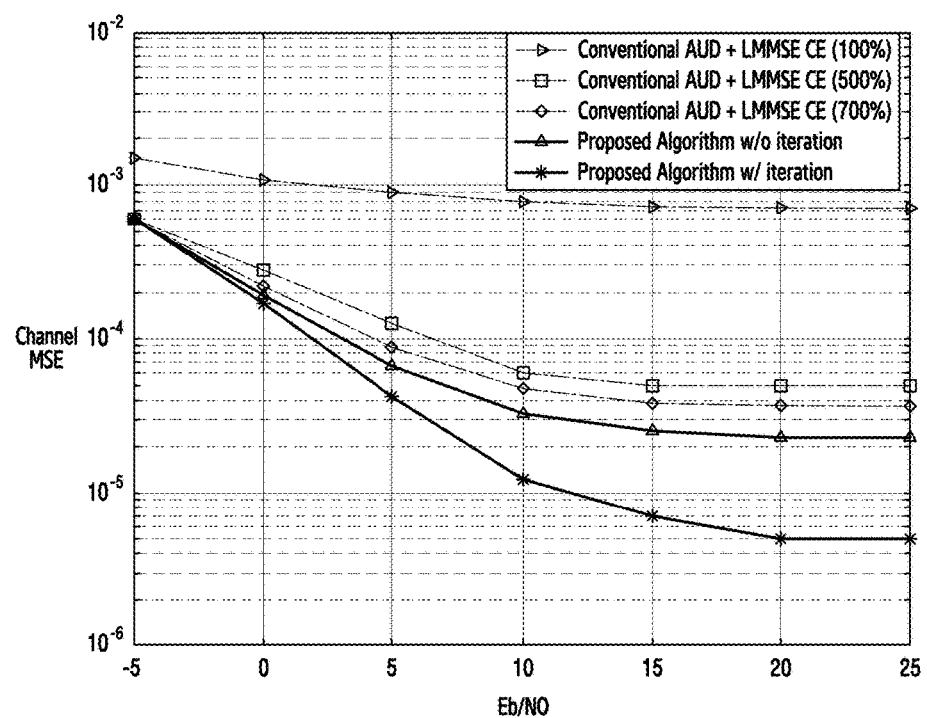
Figure 16F:
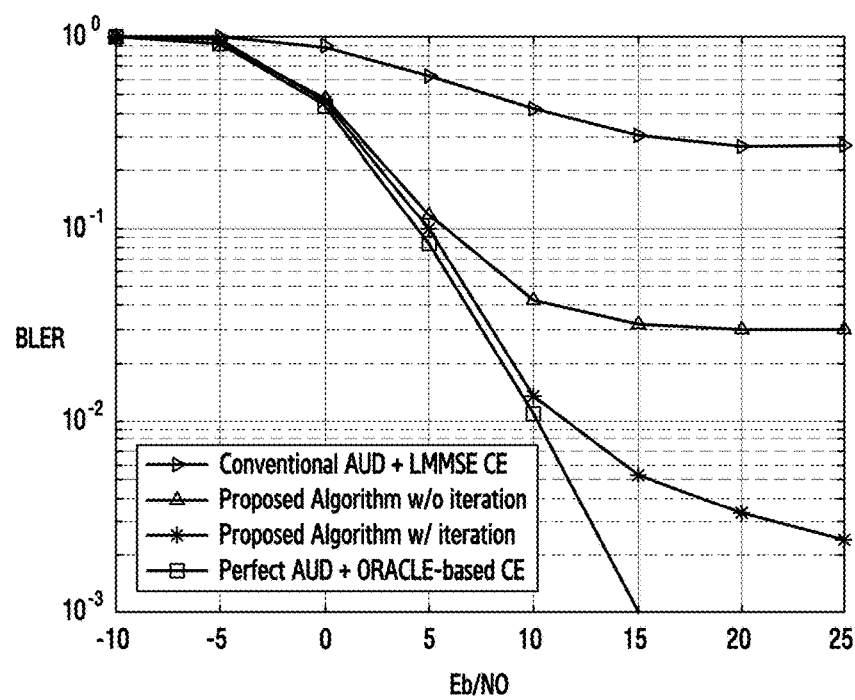
Figure 16G:
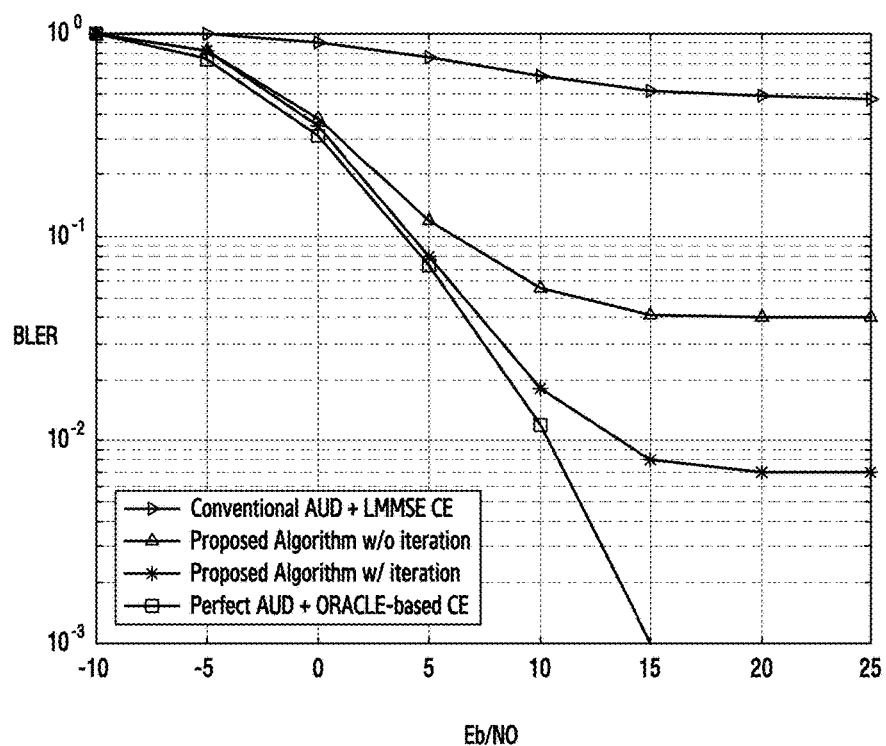

FIG. 16A illustrates mean square error (MSE) performance of time-domain channel estimation according to arrangement of a reference signal. It can be seen that, when a reference signal longer than or equal to a predetermined length is guaranteed, performance of channel estimation is maintained even if a reference signal region of the time axis is reduced and a reference signal region of a frequency domain is increased. FIGS. 16B to 16G illustrate results of simulation according to different numbers of terminals. Specifically, FIGS. 16B and 16C illustrate active user detection success probability, FIGS. 16D and 16E illustrate a channel mean square error (MSE), and FIGS. 16F and 16G illustrate a block error rate (BLER). It can be seen that, when the suggested technology is used, a reference signal overhead is reduced and performance of channel estimation is enhanced in comparison to the related-art frequency domain channel estimation. In addition, it can be seen that the active user detection performance is also enhanced by iteratively performing active user detection and channel estimation, in comparison to the related-art techniques.

Methods based on the embodiments disclosed in the claims or specification of the present disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the embodiments disclosed in the claims or specification of the present disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the present disclosure. In addition, an additional storage device on a communication network may access to a device which performs the embodiments of the present disclosure.

In the above-described specific embodiments of the present disclosure, elements included in the present disclosure are expressed in singular or plural forms according to specific embodiments. However, singular or plural forms are appropriately selected according to suggested situations for convenience of explanation, and the present disclosure is not limited to a single element or plural elements. An element which is expressed in a plural form may be configured in a singular form or an element which is expressed in a singular form may be configured in plural number.

While the present disclosure has been shown and described with reference to certain preferred embodiments thereof, it will be understood by those skilled in the art that various changes in form and details may be made therein without departing from the spirit and scope of the present disclosure as defined by the appended claims. Therefore, the scope of the present disclosure is defined not by the detailed description of the present disclosure but by the appended claims, and all differences within the scope will be construed as being included in the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating a terminal in a wireless communication system, the method comprising:
   determining a first codebook for a data signal based on a number of active terminals among a plurality of terminals including the active terminals and potentially active terminals;
   determining a second codebook for a reference signal based on the first codebook and a number of the potentially active terminals; and
   transmitting at least one reference signal generated by using the second codebook and at least one data signal generated by using the first codebook.

2. The method of claim 1, wherein:
   the at least one reference signal is transmitted through a resource region overlapping a resource for transmitting reference signals of other terminals, and
   the at least one data signal is transmitted through a resource region at least in part different from a resource for transmitting data signals of other active terminals.

3. The method of claim 1, wherein:
   the second codebook comprises a second matrix in which at least a portion of a first matrix indicating the first codebook is iterated in at least one of a row axis or a column axis, and
   at least one of the first matrixes included in the second matrix is cyclic-shifted.

4. The method of claim 1, further comprising:
receiving information regarding a resource region for transmitting the at least one reference signal.

5. The method of claim 1, further comprising:
receiving information for determining a number of sequences included in the second codebook,
wherein the information is associated with the number of potentially active terminals in a cell that is served by a base station.

6. The method of claim 1, wherein the second codebook includes more rows than the first codebook in order to provide an orthogonality or quasi-orthogonality between sequences.

7. The method of claim 1,
wherein the active terminals are identified to be capable of transmitting data signals within a resource region among the plurality of terminals being accessing a base station, and
wherein the potentially active terminals are terminals other than the active terminals among the plurality of terminals.

8. The method of claim 1,
wherein the determining the first codebook comprises determining a codebook with a size corresponding to the number of the active terminals among codebooks with a plurality of sizes.

9. A terminal in a wireless communication system, the terminal comprising:
a transceiver; and
at least one processor operably coupled to the transceiver,
wherein the at least one processor is configured to:
determine a first codebook for a data signal based on a number of active terminals among a plurality of terminals including the active terminals and potentially active terminals,
determine a second codebook for a reference signal based on the first codebook and a number of the potentially active terminals, and
transmit at least one reference signal generated by using the second codebook and at least one data signal generated by using the first codebook.

10. The terminal of claim 9, wherein:
the at least one reference signal is transmitted through a resource region overlapping a resource for transmitting reference signals of other terminals, and
the at least one data signal is transmitted through a resource region at least in part different from a resource for transmitting data signals of other active terminals.

11. The terminal of claim 9, wherein:
the second codebook comprises a second matrix in which at least a portion of a first matrix indicating the first codebook is iterated in at least one of a row axis or a column axis, and
at least one of the first matrixes included in the second matrix is cyclic-shifted.

12. The terminal of claim 9, wherein the at least one processor is further configured to receive information regarding a resource region for transmitting the at least one reference signal.

13. The terminal of claim 9, wherein the at least one processor is further configured to receive information for determining a number of sequences included in the second codebook,
wherein the information is associated with the number of the potentially active terminals in a cell that is served by a base station.

14. The terminal of claim 9, wherein the second codebook includes more rows than the first codebook in order to provide an orthogonality or quasi-orthogonality between sequences.

15. The terminal of claim 9,
wherein the active terminals are identified to be capable of transmitting data signals within a resource region among the plurality of terminals being accessing a base station, and
wherein the potentially active terminals are terminals other than the active terminals among the plurality of terminals.

16. The terminal of claim 9, wherein, in order to determine the first codebook, the at least one processor is further configured to determine a codebook with a size corresponding to the number of the active terminals among codebooks with a plurality of sizes.

17. A base station in a wireless communication system, the base station comprising:
a transceiver; and
at least one processor operably coupled to the transceiver,
wherein the at least one processor is configured to:
determine a first codebook for a data signal based on a number of active terminals among a plurality of terminals including the active terminals and potentially active terminals,
determine a second codebook for a reference signal based on the first codebook and a number of the potentially active terminals, and
receive reference signals generated by using the second codebook and data signals generated by using the first codebook.

18. The base station of claim 17, wherein:
the reference signals are transmitted through overlapping resource regions for transmitting reference signals of a plurality of terminals, and
the data signals are transmitted through resource regions different from one another in part, for transmitting data signals of the active terminals.

19. The base station of claim 17, wherein the at least one processor is further configured to:
detect a first terminal from the active terminals transmitting the reference signals;
estimate a channel of the first terminal;
remove a signal component of the first terminal from a received signal regarding the reference signals; and
detect a second terminal from the active terminals by using the received signal from which the signal component of the first terminal is removed.

20. The base station of claim 19, wherein, in order to estimate the channel of the first terminal, the at least one processor is configured to:
determine a frequency-domain channel based on estimation values regarding the reference signals from the first terminal; and
determine a time-domain channel based on the frequency-domain channel.

21. The base station of claim 19, wherein the at least one processor is further configured to detect data from the active terminals based on the first codebook and a result of detecting the active terminals.

22. The base station of claim 19, the active terminals are detected at least one of correlation algorithm and compressive sensing (CS) algorithm.

23. The base station of claim 19, wherein, in order to detect the first terminal, the at least one processor is further configured to:

perform correlation for the data signals using sequences in the second codebook for the reference signal, and detect the first terminal from the active terminals based on a result of the correlation.

24. The base station of claim 17, wherein the second codebook includes more rows than the first codebook in order to provide an orthogonality or quasi-orthogonality between sequences.

25. The base station of claim 17, wherein the active terminals are identified to be capable of transmitting data signals within a resource region among the plurality of terminals being accessing the base station, and wherein the potentially active terminals are terminals other than the active terminals among the plurality of terminals.

26. The base station of claim 17, wherein, in order to determine the first codebook, the at least one processor is further configured to determine a codebook with a size corresponding to the number of the active terminals among codebooks with a plurality of sizes.

27. The base station of claim 17, wherein:

the second codebook comprises a second matrix in which at least a portion of a first matrix indicating the first codebook is iterated in at least one of a row axis or a column axis, and at least one of the first matrixes included in the second matrix is cyclic-shifted.

* * * * *